US011440458B2

(12) United States Patent
Mollick

(10) Patent No.: US 11,440,458 B2
(45) Date of Patent: Sep. 13, 2022

(54) RATCHET LOAD BINDER WITH TAMPER DETERRENCE FEATURES

(71) Applicant: Peter Joseph Mollick, Phoenix, AZ (US)

(72) Inventor: Peter Joseph Mollick, Phoenix, AZ (US)

(\*) Notice: Subject to any disclaimer, the term of this patent is extended or adjusted under 35 U.S.C. 154(b) by 176 days.

(21) Appl. No.: 17/083,811

(22) Filed: Oct. 29, 2020

(65) Prior Publication Data

US 2021/0122287 A1    Apr. 29, 2021

Related U.S. Application Data

(60) Provisional application No. 62/973,863, filed on Oct. 29, 2019.

(51) Int. Cl.
*B60P 7/08* (2006.01)
*F16G 11/12* (2006.01)
*F16H 31/00* (2006.01)

(52) U.S. Cl.
CPC .............. *B60P 7/083* (2013.01); *F16G 11/12* (2013.01); *F16H 31/005* (2013.01)

(58) Field of Classification Search
CPC ........ B60P 7/083; B60P 7/0838; F16G 11/12; F16G 15/00; F16G 3/006; F16H 31/005; F16H 2025/2059
See application file for complete search history.

(56) References Cited

U.S. PATENT DOCUMENTS 2,220,288 A * 11/1940 Sarosdy ................. F16G 11/12
254/98
2,673,632 A * 3/1954 Stiranka ................. F16G 11/12
403/45

(Continued)

OTHER PUBLICATIONS

Chapter II for PCT/US2020/000042 dated Nov. 12, 2021.

*Primary Examiner* — Robert Sandy
*Assistant Examiner* — Louis A Mercado

(57) ABSTRACT

A hand operated tool for binding a load. The tool including a hollow tube with interior left hand and right hand threads at opposing ends. Opposing rods with exterior threads on one end and a releasable connection device on the other end that is screwed into each end of the tube. A gear rigidly mounted and encircling the tube allowing a pivotly attached ratcheting U-pawl to engage the gear teeth, the U-pawl attached to and carried by a handle assembly mounted on each side of the gear, the handle protruding perpendicular from the tube. The handle turning the tube in a first rotational direction drawing the rods closer together tightening the bind, the handle turning the tube in a second rotational direction moving the rods farther apart loosening the bind, the rods remaining stationary in rotation during rotation of the tube. A blocking device may be installed to prevent the U-pawl from pivoting into a position to turn the tube in the second rotational direction, that would loosen the bind on the load, the blocking device allowing normal ratcheting and turning of the tube in the first rotational direction tightening the bind on the load. A recessed-pawl partially pivoting independently of the U-pawl and engaging with the gear to prevent the tube from turning in the second-rotational-direction that would loosen the bind on the load when the U-pawl is in a neutral position whereby the U-pawl is not engaged with the gear.

41 Claims, 10 Drawing Sheets

(56) References Cited

U.S. PATENT DOCUMENTS

| | | | | |
|---|---|---|---|---|
| 3,338,359 | A * | 8/1967 | Baillie | B63B 25/24 |
| | | | | 254/235 |
| 4,130,269 | A * | 12/1978 | Schreyer | F16G 11/12 |
| | | | | 24/19 |
| 6,945,516 | B1 | 9/2005 | Scott | |
| 9,103,405 | B2 * | 8/2015 | Smetz | F16B 39/12 |
| 9,453,557 | B2 | 9/2016 | Chou | |
| D915,850 | S * | 4/2021 | Durbin | D8/44 |
| D917,253 | S * | 4/2021 | Durbin | D8/44 |
| 2014/0326935 | A1 * | 11/2014 | Chao | B60P 7/083 |
| | | | | 254/235 |
| 2020/0362942 | A1 * | 11/2020 | Martens | F16G 11/12 |
| 2022/0097594 | A1 * | 3/2022 | Wiebe | F16G 15/00 |

* cited by examiner

RATCHET LOAD BINDER WITH TAMPER DETERRENCE FEATURES

CROSS-REFERENCE TO RELATED APPLICATIONS

This application claims the benefit of U.S. Provisional Application No. 62/973,863 titled "Ratchet load binder with taper deterrent features" filed Oct. 29, 2019, the contents of which are incorporated herein by reference in their entirety.

BACKGROUND OF THE INVENTION

1. Field of the Invention

The invention relates to a mechanical device used to bind and secure a load usually for transportation on a truck deck or a trailer deck, particularly cargo such as equipment or merchandise that would normally shift during transport when not secured in place, the mechanical device being a ratchet load binder used individually, in multiples or in conjunction with chains or straps.

2. Description of Related Art

Ratchet load binders are used for securing a load or loads normally carried by a truck or truck and trailer combination for transportation of the load. Ratchet load binders serve the purpose of binding the load in place during transportation or for the general securing of the load. The load can be material such as construction materials, or in many cases the load is machinery and equipment. Load securing chains are generally used in place of load securing straps when the weight of the load is great or especially used when a high weighted load has the ability to roll, such as an agricultural tractor. Chains generally have a higher weight supporting capacity than straps. In some situations, the load may be directly connected to the ratchet load binder with hooks or other means mounted to the load and also mounted to the truck deck eliminating the need for straps or chains. Usually, at least two and many times more than two ratchet load binders and chains are used to secure a single load. When using a ratchet load binder with attached hooks for attaching to a chain link, only one end of the chain requires a hook, the hook on the chain binder will attach to the chain, negating the need for a second hook on the chain.

Although there are a few different ways to secure a load with a ratchet load binder and chains, a common method is attaching the ratchet load binder to separate chains at each end of the ratchet load binder, then securing one of the chains to the truck deck and the other chain to the load or over the load and to the opposing side of the truck deck. In the alternative, one chain can be attached to the ratchet load binder and then attach the other side of the ratchet load binder directly to a truck deck eyelet, then securing the chain to the load or over the load and attaching to the opposing side of the truck deck at another eyelet. This two above stated chain securing methods prevents any part of the chain from being positioned along side of the chain binder, allowing a full rotational motion of the ratchet chain binder handle operation with no interference from the chain blocking the rotation of the handle. Chain load securing methods that align the chain along side of the chain binder can be difficult to use in some instances and tend to limit the rotational operation of the ratchet load binder handle that can be further complicated when additional obstructions are in the way such as the truck deck or a trailer fender well. Another method of binding a load on a truck deck is to attach the ratchet load binder directly to the truck deck on one end of the binder and the other end of the binder directly to the load with an eyelet attachment on the load, this method also normally allows a full rotational motion of the ratchet chain binder handle operation with no interference.

A conventional ratchet load binder in the marketplace today including this disclosed invention primarily comprises an elongated tube having opposing open ends and internal threads, two rods, a handle with a gear and a ratcheting U-shaped pawl mounted in the handle. The U-shaped pawl herein referred to as a U-pawl. The tube has interior threads starting at each end with each end threading in opposite directions, a first end having right-hand internal threads and a tube second end 40 having left-hand internal threads. A gear with exterior teeth is rigidly attached around the tube and causes the tube to rotate with the gear. The two rods have exterior threads starting on one end and proceeding along the rod, the rod threads matching the tube threads. A releasable means for connection such as a hook is usually loosely and flexibly attached to the other end of the rod for attaching to a chain, eyelet or strap. The handle has two sides that wrap around the tube and is rotatably independent from the gear and tube, the ratcheting U-pawl when attached to the handle and pivotally secured next to the gear provides a first-driving-position of the tube, a second-driving-position of the tube and a neutral-position located between the two driving positions, therefore, able to drive the rotation of the gear and the tube in a first-rotational-direction or a second-rotational-direction, depending on the chosen position of the U-pawl. A spring holds the U-pawl in its selected position, the spring providing a sizable amount of pressure towards the U-pawl. The first-rotation-direction draws the rods closer together, therefore tightening the chain on the load and the second rotational direction causing the rods to move farther apart, therefore loosening the chain on the load. After loosely installing the ratchet load binder and the accompanied chains on or around a load to be secured, the binder U-pawl is set to the first-driving-position to tighten the chain for transportation of the load. After the load is ready for removal from the truck or trailer, the binder U-pawl is set to the second-driving-position to loosen and remove the chains and the binder from the load.

One longstanding problem with ratchet load binders has been the inability to easily prevent theft or tampering of the load binder, the chain, or the load, as it is very easy for a person to move the U-pawl into the second-driving-position to loosen the binder and chain to either vandalize the secured load or steal the binder, the chain or the load. There is only a limited amount of theft protection that can be added to ratchet load binders and the chains or straps that are normally securing a load, as it is easy enough to use a battery powered grinder or a large bolt cutter tool to sever the chain or strap from the load to steal the load, the binder or the chain. The object to securing a load binder from theft or tampering is to make it as difficult as possible to loosen the load binder tension on the load without using additional tools.

There have been attempts and patents granted to help deter theft or tampering of ratchet load binders with limited success. One such previously disclosed theft deterrent locking device on a load binder is disclosed in U.S. Pat. No. 9,453,557. This patent describes a locking method and two holes to insert a lock shackle into. The method of locking the chain binder in this patent is locking the gear to the handle forcing the gear and the tube to rotate with the handle preventing a back and forth action of the handle compared to the tube, preventing a loosening or tightening of the bind on the load when there is an obstruction that would obstruct a full rotation of the handle and the tube. If there is no obstruction obstructing the full rotation of the handle and the tube, the binder handle can easily be turned in either direction, loosening or tightening the bind on the load, therefore, defeating the purpose of the locking method of the binder. Another previously disclosed theft deterrent locking device is disclosed in U.S. Pat. No. 6,945,516. This patent describes a locking method and two holes in the handle wherein a lock inserted in the two holes of the handle locks the U-pawl into the engaged position with the gear wherein the U-pawl is engaged with the gear teeth without any leeway for the U-pawl to be removed from the engagement of the gear teeth, therefore resulting in the same scenario as U.S. Pat. No. 9,453,557 preventing a back and forth action of the handle compared to the tube, preventing a loosening or tightening of the bind on the load when there is an obstruction that would obstruct a full rotation of the handle and the tube. If there is no obstruction obstructing the full rotation of the handle and the tube, the binder handle can easily be turned in either direction, loosening or tightening the bind on the load, therefore, defeating the purpose of the locking method of the binder.

The above two mentioned patented theft deterrent locking devices are limited in deterring the theft of the ratchet load binders, chains or the load, as they have limitations in their practical use. The most obvious limitation in their practical use is the locking of the gear and the tube rotation to the handle rotation, as both of the above cited patents use this method. This allows the ratchet load binder to be tightened or loosened if there is unobstructed rotational motion of the handle, the unobstructed rotational motion of the handle is exacerbated with the folding handle feature in both of the above cited patents as the folding handle will be able to possibly bypass an obstruction that would normally obstruct a non-folding handle. In the instance of the handle in the folded down position, there still may be enough leverage to loosen the ratchet chain binder, therefore loosening the chains securing the load. It is noted that U.S. Pat. No. 6,945,516 recommends using excess chain to attach to the binder locking device to prevent useable rotational motion of the binder handle when the locking device is in place, but in many instances when securing a load on a truck or trailer, there may not be excess chain or even any chain available in certain load binding applications where no chain is used. For the above reasons, the two U.S. Pat. Nos. 9,453,557 and 6,945,516 are limited in practical use for theft and tamper deterrent in many load-binding applications. Another drawback of the above two US patents is the inability to tighten the bind on the load when the gear or the pawl locking device is in place. In the instance there are obstructions to the full rotations of the ratchet load binder handles, to tighten or check the bind on the load being transported, the locking device needs to be removed to provide back and forth movement of the handle and the pawl to ratchet turn the binder tube in order to draw the bind on the load tighter. The removing and then reinstalling of the locking devices can be a time consuming duty that may discourage the truck operator from checking or tightening the bind on the load.

Many ratcheting load binders in the marketplace today including the presently disclosed invention comprise multiple positions of the U-pawl for engagement or non-engagement of the U-pawl teeth with the gear teeth, the U-pawl having a first tooth and a second tooth, the prior art U-pawl positions described below:

i. a first-driving-position wherein the U-pawl first tooth is engaged with the gear teeth to turn the tube in the first-rotational-direction, tightening the bind on the load, the U-pawl being securely held in position;

ii. a second-driving-position wherein the U-pawl second tooth is engaged with the gear teeth to turn the tube in the second-rotational-direction, loosening the bind on the load, the U-pawl being securely held in position;

iii. a middle-neutral-position wherein the U-pawl is pivotly centered between the first-driving-position and the second-driving-position, and the gear is uninhibited by the U-pawl, the U-pawl may or may not be securely held in position;

BRIEF SUMMARY OF THE INVENTION

The present disclosed invention adds a practical functional degree of theft and tamper deterrence to the chain binder, chain, and the load that is being bound and secured. The disclosed invention is an improvement over previously cited patent theft and tamper deterrent locking devices on ratcheting load binders. The disclosed invention adds a means to insert a blocking device in the ratchet load binder handle assembly that allows the inserted blocking device to block and prevent the ratchet load binder U-pawl from moving into the second-driving-position that would turn the tube in the second-rotational-direction loosening the bind on the load, while still allowing the back and forth movement of the load binder handle and U-pawl in the first-driving-position for continued ratcheting action in the first-rotational-direction to tighten the bind on the load. The means to insert a blocking device to block the U-pawl from moving into the second-driving-position can be one or two holes provided through one or both sides of the handle assembly located around the pivoting area of the U-pawl, the inserted blocking device therefore permitting and restricting the pivoting action of the U-pawl to a particular pivotal area for ratchet turning of the tube in the first-driving-position. Although the second-driving-position of the U-pawl is blocked, the inserted blocking device allows the normal operation of the ratchet load binder in the first-rotation-direction keeping the ability to tighten the bind on the load while the blocking device is installed in the provided set of holes. The means to insert a blocking device can be a first-set of two holes and a second-set of two holes therethrough the two sides of the handle assembly, each set of two holes in separate positions in the handle assembly. The blocking device inserted in the first-set of holes enabling and restricting the U-pawl to the first-driving-position and a small portion of the first neutral position within ⅛ inch of the gear teeth tips outside of the gear diameter. The blocking device inserted in the second-set of holes prevents the U-pawl from moving into the second-driving-position while a first spring maintains the U-pawl position in the second-neutral-position. With the U-pawl in any one of the neutral positions and after the ratchet load binder has secured a load very tight, it is very difficult or impossible to loosen the ratchet load binder by turning the tube in the second-rotational-direction by hand without the use and leverage of the attached handle. An additional tool such as a large pipe wrench to mimic the use of the load binder handle would be needed to loosen the load binder after the load binder has secured a load tightly.

The means to insert a blocking device of the disclosed invention creates a ratchet load binder that encompasses practical theft deterrent while also enabling the operator of the ratchet load binder to use the first-rotational-direction of the load binder allowing the ratchet load binder to tighten the bind on the load even when the blocking device is in place and preventing the use of the handle to turn the tube in the second-rotational-direction that would loosen the bind on the load. Even if a tool such as a large pipe wrench was used to mimic the handle and turn the tube in the second-rotational-direction, attempting to loosen the chain, the U-pawl and the first spring holding the U-pawl in position would also have to be manually pressed and held down in the first-neutral-position to remove the U-pawl from engagement with the gear in the first-rotational-direction, this action further complicating the task of unauthorized loosening of the load binder when the blocking device is in place.

On many occasions in the transportation industry, depending on road conditions the truck is traveling on, loads are known to shift and possibly loosen the load binding equipment during transport, creating the need to constantly monitor and tighten the bind on the load when required. When a truck operator transporting a load uses chains in combination with multiple ratcheting load binders described in the disclosed invention and the blocking device of each binder is in place, the ability to easily and quickly tighten the load securing chains is a very useful option when the truck operator wants to further tighten or check the tightness of the chains by ratcheting the binder in the first-rotational-direction and feeling the force of the bind without removing the blocking device on each ratcheting load binder. The above scenario saves time for the operator and prevents the inconvenience of removing the locking device as described in U.S. Pat. Nos. 9,453,557 and 6,945,516 every time the operator wants to further tighten or check the tightness of the load securing chains. In the above two cited US patents, once the locking device is inserted in the ratchet load binder either locking the gear in place in U.S. Pat. No. 9,453,557, or locking the U-pawl in an engaged position of the gear in U.S. Pat. No. 6,945,516, the back and forth action of the binder handle and pawl is no longer available for use, therefore restricting the ability to tighten the bind of a load in many instances when the full rotation of a properly positioned handle is restricted.

As an additional feature to the disclosed invention is a recessed-pawl that engages the gear in the first-driving-position when the blocking device is inserted in the first-set of holes and when the U-pawl is manually held in the first-neutral-position that allows the U-pawl to reside within ⅛ inch of the gear outside of the gear diameter while clearing the gear teeth. The recessed-pawl recesses into the U-pawl when the when the U-pawl is in the first-driving-position and forced into the gear, the recessed-pawl is pushed out of the recessed space by a second-spring when the U-pawl is not in contact with the gear, the second-spring constantly trying to push the recessed-pawl out of the recessed space of the U-pawl. The recessed-pawl purpose is to prevent the tube from turning in the second-rotational-direction if the U-pawl is manually held in the first-neutral-position within ⅛ inch of the gear outside of the gear diameter while the blocking device is inserted in the first-set of holes. The additional recessed-pawl feature further limits the unauthorized loosening and removal of the ratchet load binder by engaging the gear in the first-driving-position and preventing the turning of the tube in the second-rotational-direction when the blocking device is inserted in the first-set of holes and in the case the U-pawl is manually pressed and held out of the first-driving-position and held into the first-neutral-position restricted to no more than ⅛ of an inch from the gear teeth outside of the gear diameter. When the blocking device is inserted in the first-set of holes, the U-pawl is able to move slightly out the first-driving-position, but the U-pawl first tooth cannot move farther than ⅛ of an inch away from the gear teeth outside of the gear diameter. The second-spring will push and pivot the recessed-pawl far enough to engage the gear teeth and maintain engagement of the recessed-pawl in the first-driving-position preventing the tube from rotating in the second-rotation-direction in any instance, therefore preventing the loosening of the ratchet binder. Still another additional feature of the present invention is an obstruction-tab rigidly mounted on the gear facing side of the U-pawl preventing access to the recessed-pawl to prevent the recessed-pawl from being disengaged from the gear when the U-Pawl is held in the first-neutral-position within ⅛ inch of the gear outside of the gear diameter.

In summary, when comparing the disclosed invention to the above cited prior art US patents, the prior art devices when the locking device is installed, must have an obstruction in place to prevent the binder handle from rotating in the second rotational direction to prevent the loosening of the load binder, and if there is an obstruction in place blocking the handle rotation, the load binder cannot be tightened while the locking devices are in place, therefore causing the operator of the load binders to remove the locking devices in order to check and confirm the load securing chains are still as tight as required for transportation of the secured load. If there is no obstruction of the handle in place such as a truck deck or excess chain attached to the locking device, the handle can be turned in the first-rotational-direction or the second-rotational-direction tightening or loosening the load binder chains, therefore making the locking devices useless. The disclosed in invention does not need an additional lockable device to block the rotation of the handle in the second rotation direction to prevent the loosening of the binder chains using the handle. The present invention comprising the first-set and the second-set of holes to install a blocking device in the handle assembly is a distinct improvement of the prior art of ratchet load binders improving the usability and tamper resistance to the ratchet load binders therefore preventing the U-pawl from engaging the gear teeth in the second rotational direction preventing the use of leverage of the handle to achieve loosening of the binder chains, all the while still allowing the use of the handle and the ratchet action in the first-rotational-direction to tighten the binder chains. Adding the recessed-pawl and the obstruction tab to the ratchet load binder adds an additional level of tamper resistance preventing the second-rotation-direction of the tube in most all case while the blocking device is in the first-set of holes.

BRIEF DESCRIPTION OF THE DRAWINGS

A better understanding of the present invention will be had upon reference to the following description in conjunction with the accompanying drawings in which like numerals refer to like parts throughout the views wherein.

DETAILED DESCRIPTION OF THE INVENTION

Reference Numerals

Figure 1:
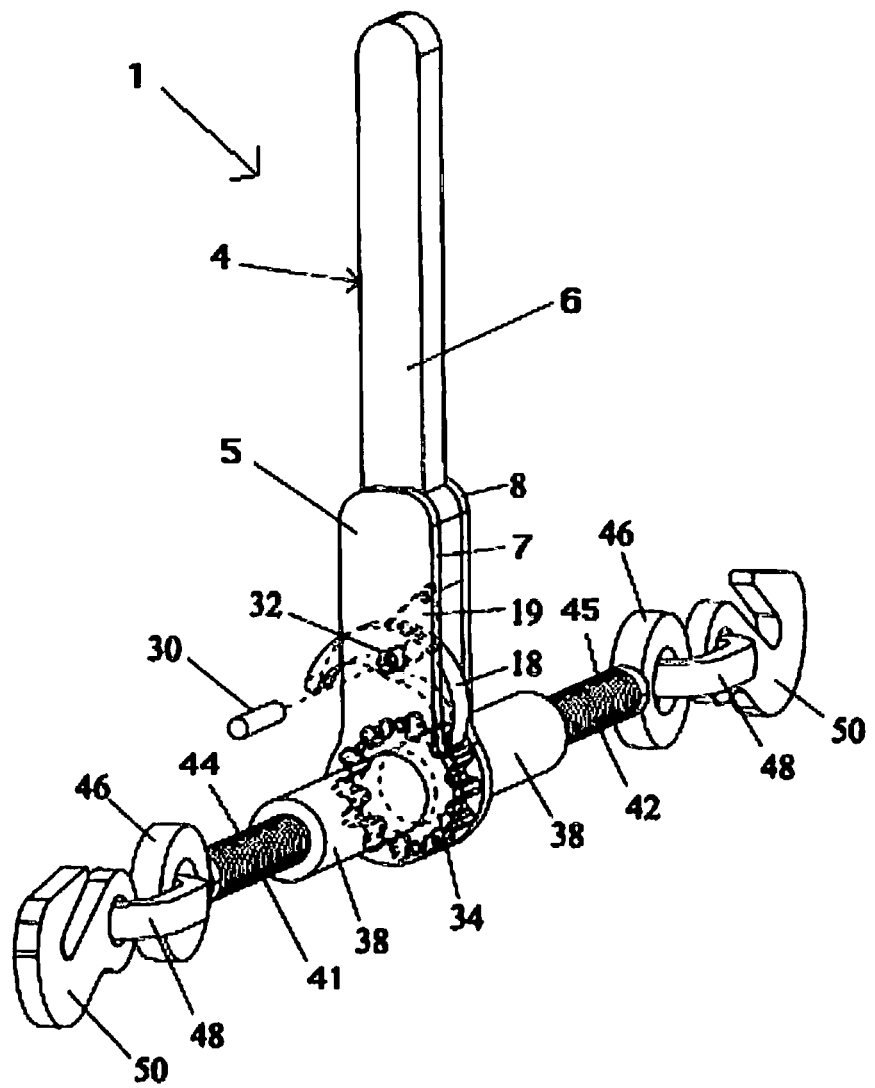
FIG. 1 is a perspective view showing a prior art ratchet load binder.

For the convenience of the reader, the following is a list of reference numbers used in this description.
1 Ratchet load binder—prior Art
2 Ratchet load binder—disclosed invention
4 Handle assembly
5 Handle assembly U-pawl housing
6 Handle assembly shaft
7 Handle assembly first side
8 Handle assembly second side
9 Handle assembly U-pawl axle hole
10 First spring
12 First spring hook
14 First spring stabilizer stem
16 First spring stabilizer stem ball end
18 U-Pawl
18a first-driving-position
18b first-neutral-position
18c second-driving-position
18d second-neutral-position
18e middle-neutral-position
19 U-Pawl head
20 U-Pawl eyelet
22 U-Pawl first arm
24 U-Pawl second arm
26 U-Pawl first tooth
28 U-Pawl second tooth
30 U-Pawl pivot axle
32 U-Pawl pivot hole
33 U-Pawl recessed space
34 Gear
35 Gear teeth
36 Gear teeth roots
37 Gear teeth tips
38 Tube 39 Tube first end internal threads
40 Tube second end internal threads
41 First rod
42 Second rod
44 First rod external threads, right hand threads
45 Second rod external threads, left hand threads
46 Rod eyelet
47 Rod first end
48 Rod flexible connector
49 Rod second end
50 Rod hook
52 First-set of holes
53 First hole
54 Second-set of holes
55 Second hole
56 Blocking device storage hole
57 First hole color-coding
58 Obstruction-tab
59 Second hole color-coding
60 Blocking device
62 Blocking device lock
64 Recessed-pawl
65 Recessed-pawl tooth
66 Recessed-pawl arm
68 Recessed-pawl pivot hole
69 U-pawl stop surface
70 Recessed-pawl stop surface
72 Second-spring
74 Second-spring insertion hole
76 U-Pawl head, narrow shape.
78 First set of holes, first alternate position
80 First set of holes, second alternate position
82 First set of holes, third alternate position
84 First rotational direction
86 Second rotational direction
88 First hole numeral
90 Second hole numeral For clarity of the drawings the U-pawl position will also reflect the disclosed invention mode of operation as follows:

"18a U-pawl first-driving-position" corresponds to turning the tube to tighten the bind on the load, with or without the blocking device installed.

"18b U-pawl first-neutral-position" allows the tube to be freewheeled when the U-pawl is pressed against the blocking device when the blocking device in installed in the first set of holes 52 and there is no tension on the tube such as when a load is tightly bound.

"18c U-pawl second-driving-position" corresponds to turning the tube to loosen the bind on the load with no blocking device installed.

"18d U-pawl second-neutral-zone" corresponds to a secured U-pawl position allowing freewheeling of the gear and the tube in either the tightening or loosening direction and there is no tension on the tube such as when a load is tightly bound.

"18e U-pawl middle-neutral-position" corresponds to an unsecured U-pawl position allowing freewheeling of the gear and the tube in either the tightening or loosening direction. This position of the U-pawl is not a usable position of the U-pawl because the U-pawl can easily fall out of this position with a slight nudge on the U-pawl in either direction of one of the U-pawls teeth.

FIG. 1 is a perspective view showing a prior art ratchet load binder 1. The handle assembly 4 comprises the handle assembly U-pawl housing 5 with a handle assembly first side 7 and a handle assembly second side 8 attached to a handle assembly shaft 6. The handle assembly comprising a shaft and two separated sides, the sides rotatably mounted around the tube to rotate completely around the tube while straddling the gear, the handle assembly generally perpendicular to the tube, the handle assembly having a first side positioned on one side of the gear and a second side positioned on the opposing side of the gear, the handle assembly first and second sides encircling the tube The U-pawl 18 is positioned between the handle assembly first side 7 and second side 8. Attached to the U-pawl 18 is the U-pawl head 19 where the first spring attaches. The U-pawl 18 pivots on the U-pawl pivot axle 30 through the U-pawl pivot hole 30. The U-pawl 18 ratchet turns the gear encircling the tube, the gear rigidly attached to the tube, the gear having externally facing teeth, the U-pawl 18 ratchet turning the tube 38 in a chosen direction. The tube 38 comprises internal threads 40 (see FIG. 5) located inside the tube 38. The tube 38 having opposing open ends and internal threads, the tube first end threads 39 are right hand internal threads and the tube second end threads 40 are left hand internal threads. A first rod 41 comprising right hand external threads 44 mating to the threads in the first end of the tube 39, the threads starting at the rod first end 47 and extending along the first rod 41, and a second rod 42 comprising left hand external threads mating to the threads in the tube second end 40, the threads starting at the rod first end 47 and extending along the second rod 42, the external threads of the first rod 41 match the tube first end internal threads 39 and the external threads of the second rod 42 match the tube second end internal threads 40, the first rod 41 threading into the first end of the tube 39, the second rod 42 threading into the second end of the tube 40. The tube 38 movable in a first-rotational-direction 84 and the tube 38 movable in a second-rotational-direction 86. The first-rotational-direction 84 of the tube 38 moves the rods closer to each other while the rods are stationary in rotation, the second-rotational-direction 86 of the tube 38 moves the rods farther away from each other while the rods are stationary in rotation, each rod second end 49 having a releasable connection device such as a rod hook 50. Attached to the end of the first rod 41 is a rod eyelet 46 and attached to the end of the second rod 42 is a rod eyelet 46. The rod eyelet 46 flexibly connecting to a rod flexible connector 48, and the rod flexible connector 48 is flexibly connecting to a rod hook 50. The U-pawl 18 is shown in the first-driving-position 18a (see FIG. 6).

Figure 2:
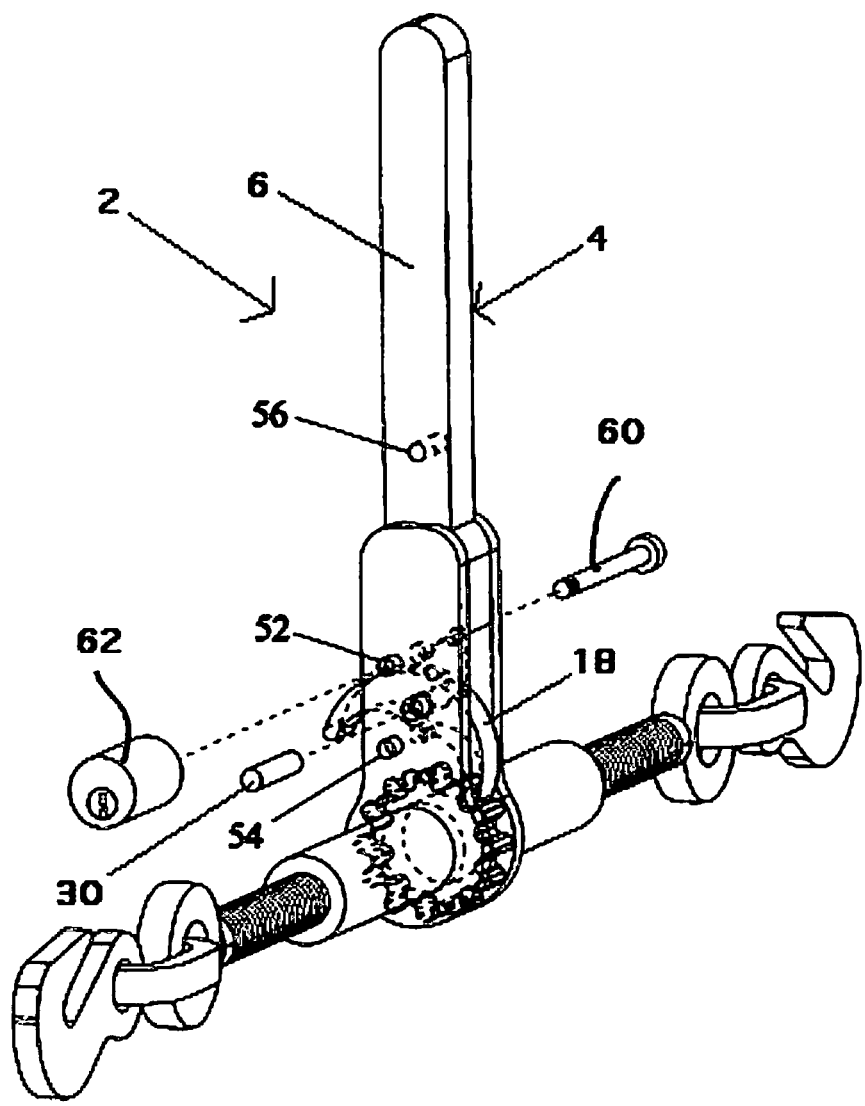
FIG. 2 is a perspective view showing the disclosed invention, the ratchet binder with the first-set of holes, the second-set of holes, the blocking device storage hole, the blocking device, and the blocking device lock.

FIG. 2 is a perspective view showing the disclosed invention ratchet load binder 2 comprising the prior art ratchet load binder 1 with added tamper and theft deterrence features. The tamper and theft deterrence features are the first-set of holes 52, the second-set of holes 54 and the blocking device 60 with a blocking device lock 62. The tamper and theft deterrence features are an integral part of and improvement to the prior art ratchet load binder. The blocking device 60 and the blocking device lock 62 use is enabled by the first-set of holes 52 and the second-set of holes 54. There are a multiple of blocking devices that can be used for the blocking device 60 and the blocking device lock 62 such as a padlock, a pin and a barrel lock, or a bolt head comprising a unique configuration that requires a tool with the same unique configuration to mate with the bolt head to securely install and remove the bolt. The first-set of holes 52 can accommodate a blocking device 60 to prevent the U-pawl 18 from moving from the first-driving-position 18a (see FIG. 6) to:
 i) the U-pawl second-driving-position 18c (see FIG. 9);
 ii) the U-pawl second-neutral-position 18d (see FIG. 10);
 iii) the U-pawl middle-neutral-position 18e (see FIG. 11).

The blocking device 60 will prevent the U-pawl 18 and the handle assembly 4 from being used to operate the ratchet load binder 2 in the second-rotational-direction 86 (see FIG. 18), therefore preventing the handle assembly 4 and the U-pawl 18 from loosening the bind on the load.

The blocking device storage hole 56 is positioned at the base of the handle assembly shaft 6 to allow the easy operation of the handle assembly 4 with the blocking device stored in the blocking device storage hole 56 when the blocking device is not inserted in the first-set of holes or the second-set of holes. The blocking device storage hole 56 being positioned at the base of the handle assembly shaft 6 allows the ratchet load binder operator ample room to grasp the handle assembly shaft 6 without being inconvenienced by the stored blocking device 60. A blocking device lock 62 is shown removably attached to the blocking device 60 preventing the blocking device 60 from being removed from the ratchet load binder 2 without the proper key.

Figure 3:
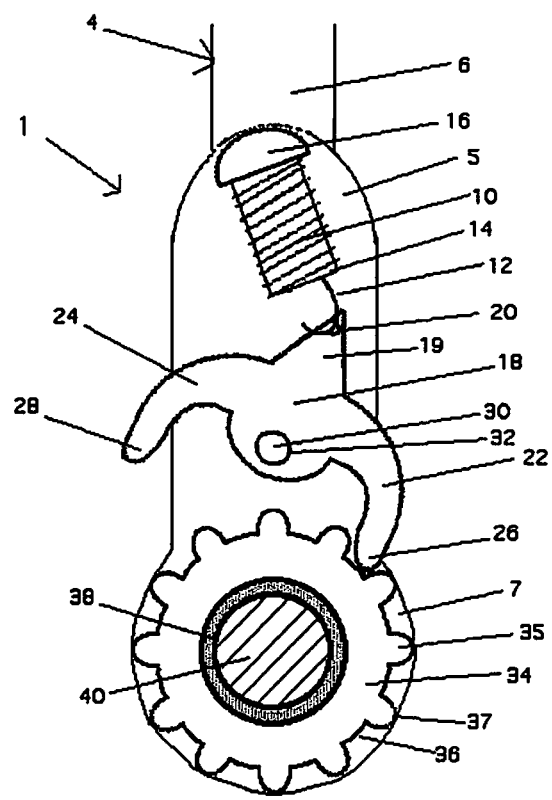
FIG. 3 is a side elevation section view of a prior art ratchet load binder 1 schematically showing the interior parts of the handle assembly U-pawl housing between the handle assembly sides.

FIG. 3 is a side elevation section view of a prior art ratchet load binder 1 schematically showing the interior parts of the handle assembly U-pawl housing 5 between the handle assembly 4 first side 7 (see FIG. 1) and second side 8 (see FIG. 1). The handle assembly shaft 6 is shown attached to the handle assembly U-pawl assembly 5 that houses the first spring 10 that is wrapped around the first spring stabilizer stem 14 with a first spring stabilizer stem ball end 16 attached to the end of the stabilizer stem 14. The first spring stabilizer stem ball end 16 pivots at the top of the handle assembly U-pawl housing 5 as the U-pawl 18 is moved from one position to another position allowing pivotal movement of the first spring 10. The pivotal attached U-shaped-pawl 18 referred herein as a U-pawl 18 with a first tooth 22 on one end of the U-pawl 18 and a second tooth 24 on the opposing end of the U-pawl 18, the first tooth 22 for driving the rotation of the tube 38 in the first-rotational-direction 84 and the second tooth 24 for driving the rotation of the tube 38 in the second-rotational-direction 86, the U-pawl teeth 22+24 for engaging the gear teeth 35, the U-pawl 18 attached to the handle assembly between the first side 7 and the second side 8, the U-pawl 18 pivoting on an axle 30 inserted at a pivot hole 32 on the U-pawl 18, the axle 30 being attached to the handle assembly first side 7 and the second side 8 that straddles the gear 34, the pivot axle 30 on the U-pawl 18 being generally centered between the first tooth 22 and the second tooth 24 of the U-pawl 18, the U-pawl 18 having;

i. a first-driving-position 18*a*;
ii. a second-driving-position 18*c*; and
iii. a middle-neutral-position 18*e*.

The first spring hook 12 attaches to the U-pawl head 19 through a U-pawl eyelet 20 allowing pivoting action of the U-pawl 18 and the first spring 10. The U-pawl first arm 22 is shown with the U-pawl first tooth 26 located at the end of the U-pawl first arm 22. The U-pawl second arm 24 is shown with the U-pawl second tooth 28 located at the end of the U-pawl second arm 24. The U-pawl pivot hole 32 is located at a center point of the U-pawl 18 to pivot on a U-pawl pivot axle 30, the U-pawl pivot axle 30 attaching to the handle assembly 4 first side 7 (not shown) and second side 8 (not identified). The U-pawl first tooth 26 is shown engaging the gear 34 between the gear teeth 35 at the gear tooth root 36 and also showing the gear teeth tips 37. The handle assembly U-pawl assembly 5 connects to the handle assembly first side 7 (not shown) and the handle assembly second side 8 (not identified). The tube 38 is shown with the tube first end internal threads 39 (not shown) and the tube second end internal threads 40. The first spring 10 applying flexible pressure on the U-pawl 18 causing the U-pawl 18 to be held securely in either the first-driving-position 18*a* or the second-driving-position 18*c*. The first spring 10 being secured in the handle assembly 4 and keeping the U-pawl 18 first tooth 26 or the second tooth 28 engaged with the gear teeth 35 during ratcheting rotation of the tube 38. The first spring 10 allowing flexible pivotal movement of the U-pawl 18 first tooth 26 or the second tooth 28 around the gear teeth roots 36 and the gear teeth tips 37 for incremental back and forth movement of the handle assembly 4 and the U-pawl 18 during the ratcheting rotational movement of the tube 38 while maintaining the U-pawl 18 first tooth 26 or the second tooth 28 in contact with the gear 34. Moving the U-pawl 18 from the first-driving-position 18*a* to the second-driving-position 18*c* or vice versa requires the U-pawl 18 to be manually and forcefully pivoted, and wherein pivoting the U-pawl 18 initially contracts the first spring 10 while moving the U-pawl 18 towards the middle-neutral-position 18*e* and then expands the first spring 10 when the U-pawl moves past the middle-neutral-position 18*e* to the opposing driving position 18*a* or 18*c*.

Figure 4:
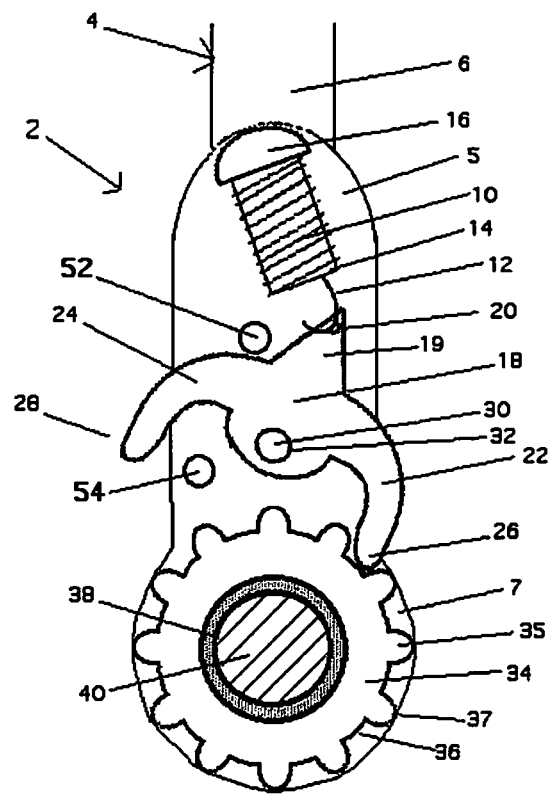
FIG. 4 is a side elevation section view of the disclosed invention schematically showing the interior parts between the two handle assembly sides of the ratchet load binder. The U-pawl residing and held firmly and in the first-driving-position while still allowing the U-pawl first tooth to flexibly move around the gear teeth roots and tips.

FIG. 4 is a side elevation section view of the disclosed invention ratchet load binder 2 comprising all of the features of the prior art ratchet load binder 1 (See FIG. 3) while also comprising the additional aligned first set of holes 52, and the additional aligned second set of holes 54. The disclosed invention ratchet load binder 2 resulting in combining the prior art ratchet load binder 1 and all of its features with the added tamper deterrent features, the first set of holes 52, and the second set of holes 54 of the ratchet load binder 2. Additional tamper deterrence features described in this entire application such as the recessed-pawl 64 (not shown) (see FIGS. 12 and 16) can also be added to the disclosed invention. The U-pawl 18 (See FIG. 3) residing and held firmly and in the U-pawl 18 first-driving-position 18*a* (see FIG. 6). The aligned first-set of two holes 52 positioned in the handle assembly 4 sides 7+8 (see FIG. 5) is for the insertion of the blocking device 60 wherein the insertion of the blocking device 60 in the first-set of holes 52 prevents the U-pawl 18 from pivoting from the first-driving-position 18*a* (See FIG. 6) into or beyond the middle-neutral-position 18*e* (See FIG. 11) while allowing the U-pawl movement in the first-driving-position 18*a* (See FIG. 6) wherein the U-pawl 18 first tooth 26 has no more than ⅛ inch of clearance away from the gear teeth tips 37 outside of the gear 34 diameter, and wherein the inserted blocking device 60 allows normal back and forth operation of the U-pawl 18 in the first-driving-position 18*a* (See FIG. 6) while ratchet turning the tube 38 in the first-rotational-direction 84 (See FIG. 17). Insertion of the blocking device 60 in the first-set of holes 52 and if the U-pawl 18 is held against the blocking device 60, creates:

i. a first-neutral-position 18*b* (See FIG. 8) of the U-pawl 18, the first-neutral-position 18*b* allowing freewheeling of the tube 28 in either direction and creating a clearance of the U-pawl 18 first arm 22 of about ⅛ inch or less from the gear teeth tips 37.

Figure 11:
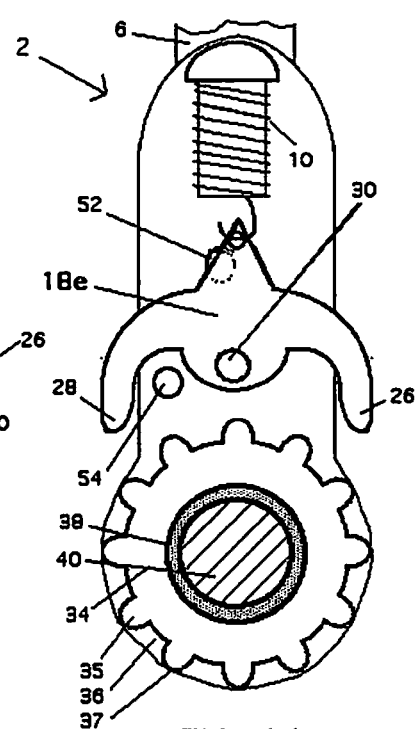
FIG. 11 is a side elevation section view of the disclosed invention schematically showing the position of the U-pawl relative to the gear and relative to first-set and the second-set of holes. The U-pawl residing in and not held firmly in the middle-neutral-position. The U-pawl is not in contact with the gear at any point of rotation of the gear. The blocking device is not installed in the first-set of holes or the second-set of holes.

The ratchet load binder 2 comprising an aligned second-set of two holes 52 positioned in the handle assembly 4 sides 7+8 for the insertion of the blocking device 60 and wherein the insertion of the blocking device 60 in the second-set of holes 52 prevents the U-pawl 18 from pivoting to the second-driving-position 18*c* when the U-pawl 18 resides in either i) the first-driving-position 18*a*, ii) the first-neutral-position 18*b*, or iii) the middle-neutral-position 18*e* (See FIG. 11). The inserted blocking device 60 allows normal back and forth operation of the U-pawl 18 in the firstdriving-position 18a (See FIG. 6) while ratchet turning the tube 38 in the first-rotational-direction 84. When the blocking device 60 is inserted and the U-pawl 18 is positioned against the blocking device 60, it creates:

i. a second-neutral-position 18d (See FIG. 10) of the U-pawl 18, the second-neutral-position 18d allowing freewheeling of the tube 38 in either direction. The U-pawl 18 will remain securely in the second-neutral-position 18d, the first spring 10 and the inserted blocking device 60 maintaining the U-pawl 18 position in the second-neutral-position 18d unless the U-pawl 18 is manually moved from the second-neutral-position 18d.

When the blocking device 60 (See FIG. 2) is inserted in the first-set of holes 52, the U-Pawl 18 is free to operate normally in the U-pawl first-driving-position 18a ratchet turning the tube 38 in the first-rotational-direction 84 (see FIG. 17) tightening the bind on the load, the U-pawl first tooth 26 is able to move approximately ⅛ inch into the U-pawl first-neutral-position 18b (See FIG. 8) to aid the U-pawl first tooth 26 in clearing the gear teeth tips 37 while ratchet turning the tube 38. In the event, the blocking device 60 (See FIG. 2) is inserted in the first-set of holes 52, in order to move the U-pawl first-tooth 26 off of the gear teeth tips 37 and slightly into the U-pawl 18 first-neutral-position 18b, the U-pawl 18 must be forcefully pushed into the first-neutral-position 18b (See FIG. 8) because the first spring 10 is constantly pushing the U-pawl 18 into the first-driving-position 18a (See FIG. 6) from the U-pawl first-neutral-position 18b (See FIG. 8). The normal operation of the U-Pawl 18 in the first-rotational-direction 84 includes the U-pawl 18 moving around the gear teeth roots 36 and the gear teeth tips 37 to allow back and forth movement of the handle assembly 4 and the U-pawl 18 while the U-Pawl 18 moves across the gear teeth roots 36 and gear teeth tips 37 in order to reset to a new gear tooth 35 and continue the ratchet driving and rotation of the tube 38.

When the blocking device 60 (See FIG. 10) is inserted in the second-set of holes 54, the U-Pawl 18 is free to operate normally in the U-pawl first-driving-position 18a (See FIG. 6) ratchet turning the tube 38 in the first-rotational-direction 84 (see FIG. 17) tightening the bind on the load, and again, normal operation of the U-Pawl 18 in the first-rotational-direction 84 includes the U-pawl 18 moving around the gear teeth roots 36 and gear teeth tips 37 to allow back and forth movement of the handle assembly 4 and the U-pawl 18 as the U-Pawl 18 moves across the gear teeth 35. Furthermore when the blocking device 60 (See FIG. 10) is inserted in the second-set of holes 54 the U-Pawl 18 is able to be pushed to the U-pawl 18 second-neutral-position 18d (See FIG. 10) whereas it can securely reside with pressure from the first spring 10 holding the U-pawl 18 against the blocking device 60, therefore holding the U-pawl 18 position in the second-neutral-position 18d (See FIG. 10) until the U-pawl 18 is forcefully pushed out of the second-neutral-position 18d or until the blocking device 60 is removed. A function of the second-set of holes 54 is for the inserted blocking device 60 (See FIG. 10) to maintain the position of the U-pawl 18 in the second-neutral-position 18d (See FIG. 10) allowing the ratchet binder operator to freewheel spin the tube 38 and the gear 34 without the U-pawl 18 touching or obstructing the gear 34 or the tube 38 rotation. Freewheel spinning of the tube 38 allows a faster rotation of the tube 38 in either direction as compared to turning the tube 38 with the handle assembly 4 as long as there is no or little tension on the ratchet binder 2.

Figure 5:
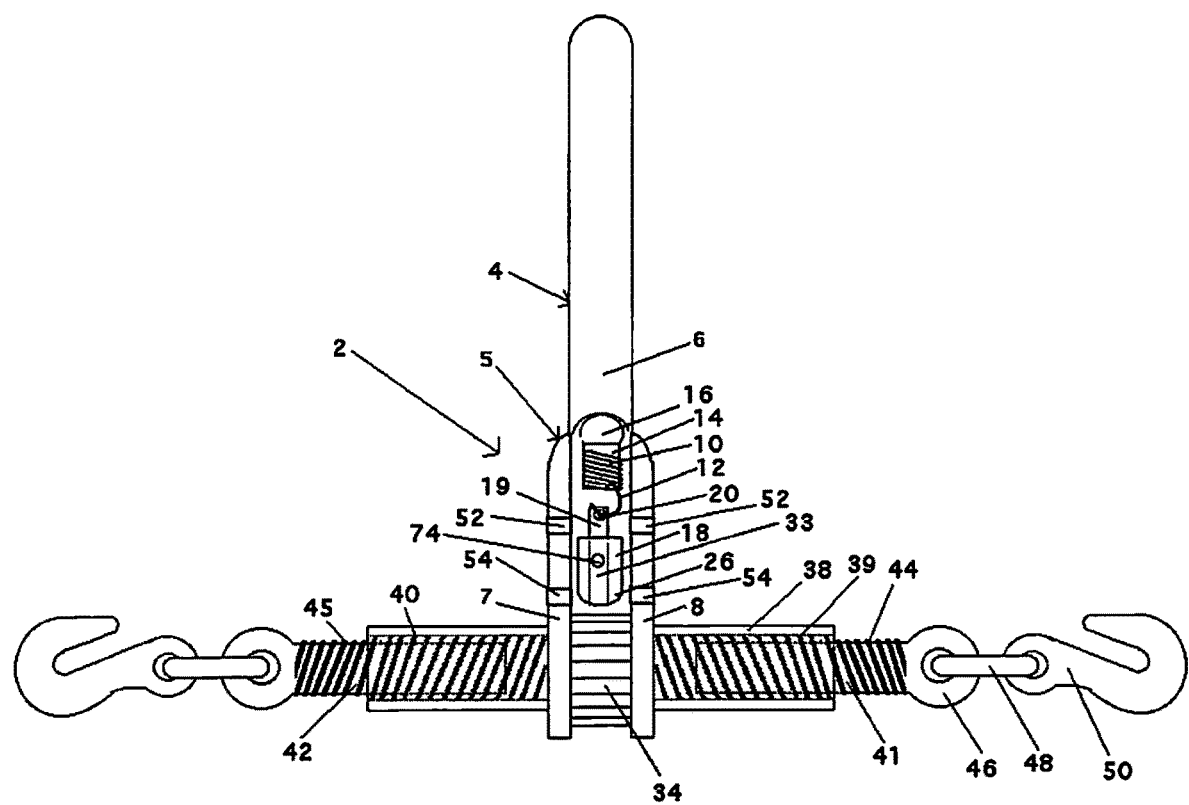
FIG. 5 is a front elevation view of the disclosed invention schematically showing the interior parts between the two sides of the ratchet load binder, showing the tube interior and the first set of holes and the second set of holes.
Figure 9:
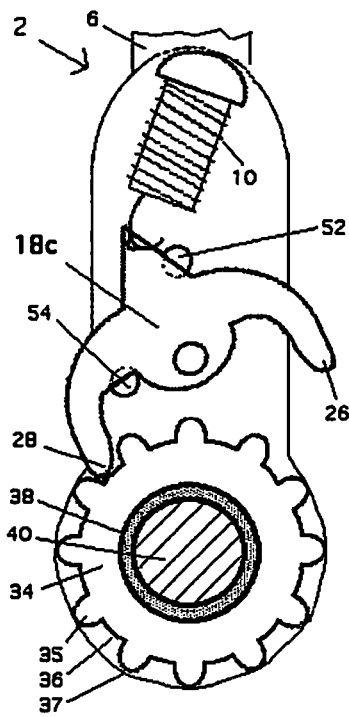
FIG. 9 is a side elevation section view of the disclosed invention schematically showing the position of the U-pawl relative to the gear and relative to the first-set and the second-set of holes. The U-pawl engaging the gear teeth root and held firmly in the second-driving-position.

FIG. 5 shows a means for applying flexible pressure on the U-pawl 18 such as a first spring 10 causing the U-pawl 18 to be held securely in either the first-driving-position 18a (see FIG. 6) or the second-driving-position 18c (see FIG. 9). A first spring stabilizer stem 14 inserted inside the first spring 10 stabilizes the position of the first spring 10 in the handle assembly 4. The flexible pressure on the U-pawl 18 keeping the U-pawl first tooth 26 or the U-pawl second tooth 28 engaged with the gear teeth 34 during the rotation of the tube 38, the means for applying flexible pressure on the U-pawl 18 allowing flexible pivotal movement of the U-pawl first tooth 26 or the second tooth 28 around the gear teeth roots 36 and the gear teeth tips 37 for incremental back and forth movement of the handle assembly 4 during the ratcheting movement of the tube 38, while maintaining the U-pawl first tooth 26 or the U-pawl second tooth 28 in contact with the gear teeth 35.

FIG. 5 is a front elevation view of the disclosed invention ratchet load binder 2 schematically showing the interior parts of the handle assembly U-pawl housing 5 between the handle assembly first side 7 and the handle assembly second side 8 and how the interior parts are positioned in relation to the first-set of holes 52 and the second-set of holes 54. Shown is the handle assembly 4 with the handle assembly shaft 6 and the handle assembly U-pawl housing 5. The tube 38 is shown with the tube first end internal threads 39 and the tube second end internal threads 40, the first rod 41 threading into the tube first end internal threads 39 with the first rod external threads 44 matching the tube first end internal threads 39, the second rod 42 threading into the tube second end internal threads 40 with the second rod external threads 45 matching the tube second end internal threads 40. The rod eyelet 46 rigidly attached to each rod second end 49, each of the first rod 41 and the second rod 42 and the rod eyelet connected flexibly to the rod flexible connector 48, the rod flexible connector 48 flexibly connected to the rod hook 50. The rod hook 50 is configured to attach to a chain link or a combination of chain-links. The first set of holes 52 is shown with no blocking device 60 (see FIG. 2) installed. The second set of holes 54 is shown with no blocking device 60 (see FIG. 2) installed. The U-pawl 18 is shown with the U-pawl first tooth 26 and the U-Pawl recessed space 33 (shown in dotted lines portraying hidden in this drawing). The U-pawl head 19 is shown with the U-pawl eyelet 20 receiving the first spring hook 12 through the U-pawl eyelet 20. The first spring 10 is wrapped around the first spring stabilizer stem 14 and the first spring stabilizer stem 14 is attached to the first spring stabilizer stem ball end 16. The gear 34 is shown rigidly attached to the tube. The first-set of holes 52 and the second-set of holes 54 each can comprise one threaded hole and one non-threaded hole being a slip hole. The blocking device 60 can be lockable and comprise a shackle. The shackle can be a pin or a shackle of a padlock. The blocking device 60 can be extendable and retractable such as an extendable lock attached to the handle assembly 4. The blocking device 60 can be a a barrel lock attached to the pin and wherein the pin is grooved to accommodate the barrel lock locking mechanism. The blocking device 60 can be a threaded bolt comprising a shaft with a head end, and a threaded end. A blocking device 60 pin can have a pin stop end that is recessed into the handle assembly 4.

Figure 6:
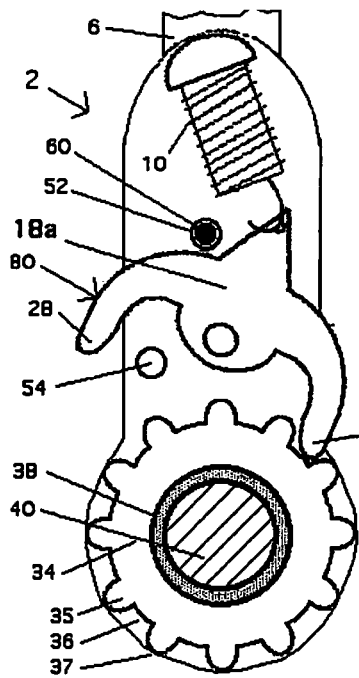
FIG. 6 is a side elevation section view of the disclosed invention schematically showing the position of the U-pawl relative to the gear and relative to the first-set of holes and the second-set of holes. The U-pawl engaging the gear teeth root and held firmly in the first-driving-position.

FIG. 6 is a side elevation section view of the disclosed invention with the U-pawl 18 positioned in the first-driving-position 18a and schematically showing the position of the U-pawl 18 relative to the gear 34 and relative to the first-set of holes 52 and relative to the second-set of holes 54. The blocking device 60 is installed in the first-set of holes 52.

The U-pawl 18 engaging the gear teeth root 36 and held firmly in the first-driving-position 18a by the first spring 10 while allowing the U-pawl first tooth 26 to flexibly move around the gear teeth roots 36 and gear teeth tips 37. The blocking device 60 is not installed in the second-set of holes 54, therefore, the U-pawl 18 may not be moved out of this first-driving-position 18a. When using the disclosed invention ratchet chain binder 2 to bind a load on a truck deck, the most common and useful insertion of the blocking device 60 is in the first-set of holes 52. The insertion of the blocking device 60 is in the first-set of holes 52 allows the ratchet binder 2 operator to tighten or re-tighten the load at any time without removing the blocking device. In addition, with the blocking device 60 securely locked in place in the first-set of holes 52, the U-pawl 18 cannot be moved out of the first-driving-position 18a or moved out of the first-neutral-position 18b (see FIG. 8), making the bind on the load virtually impossible to loosen without an additional tool such as a pipe wrench to turn the tube 38 in the second-rotational-direction 86 while also concurrently manually holding the U-pawl 18 in the first-neutral-position 18b (see FIG. 8), irregardless of the first spring 10 constantly pressuring the U-pawl 18 into the first-driving-position 18a (see FIG. 6).

Figure 7:
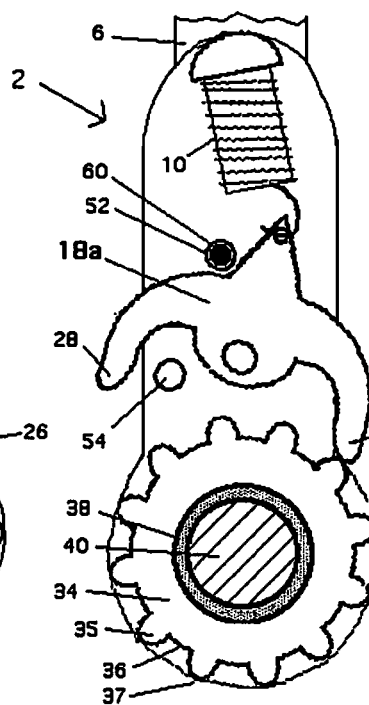
FIG. 7 is a side elevation section view of the disclosed invention schematically showing the position of the U-pawl relative to the gear and relative to the first-set of holes and the second-set of holes. The U-pawl moving around the gear teeth tips and held firmly in the first-driving-position.

FIG. 7 is a side elevation section view of the disclosed invention with the U-pawl 18 positioned in the first-driving-position 18a (see FIG. 6) and schematically showing the position of the U-pawl 18 relative to the gear 34 and relative to the first-set of holes 52 and relative to the second-set of holes 54. The U-pawl 18 is shown riding on the gear teeth tip 37 and held firmly in the first-driving-position 18a by the first spring 10 while allowing the U-pawl first tooth 26 to flexibly move around the gear teeth roots 36 and gear teeth tips 37. The blocking device 60 is installed in the first-set of holes 52 and the blocking device 60 is not installed in the second-set of holes 54, therefore, the U-pawl 18 may not be moved out of and remain out of the first-driving-position 18a unless external force holds the U-pawl 18 in the first-neutral-position 18b (see FIG. 8). If the U-pawl 18 is moved from the first-driving-position 18a to the first-neutral-position 18b with external force, the U-pawl 18 will return to the first-driving-position 18a when the external force is removed.

Figure 8:
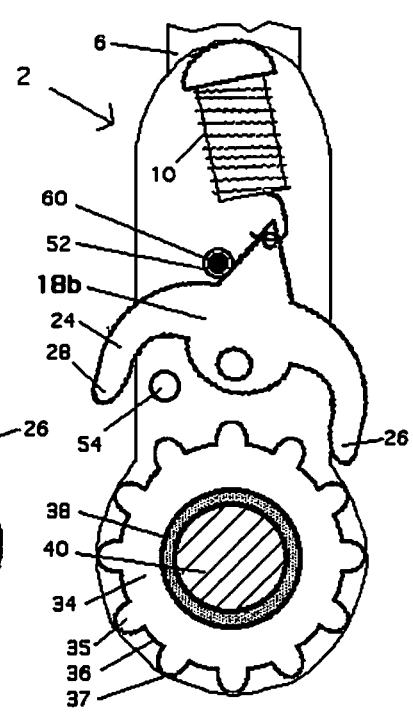
FIG. 8 is a side elevation section view of the disclosed invention schematically showing the position of the U-pawl relative to the gear and relative to the first-set and the second-set of holes. The U-pawl residing in the first-neutral-position, the U-pawl is not in contact with the gear at any point of rotation of the gear. The blocking device is installed in the first-set of holes and not installed in the second-set of holes.

FIG. 8 is a side elevation section view of the disclosed invention with the U-pawl 18 positioned in the first-neutral-position 18b and schematically showing the position of the U-pawl 18 relative to the gear 34 and relative to the first-set of holes 52 and relative to the second-set of holes 54. The U-pawl 18 is residing in the first-neutral-position 18b and the U-pawl head 19 is manually held against the blocking device 60, the U-pawl 18 is not in contact with the gear 34 and the U-pawl 18 is being held in the U-pawl 18 first-neutral-position 18b by external force on the U-pawl second arm 24, therefore holding the U-pawl 18 in the first-neutral-position 18b irregardless of the pressure from the first spring 10 attempting to force the U-pawl 18 into the first-driving-position 18a. The blocking device 60 is installed in the first-set of holes 52 limiting the U-pawl 18 to ⅛ inch away from the gear tooth tip 37 outside of the gear 34 diameter. The blocking device 60 is not installed in the second-set of holes 54. When the U-pawl 18 is in the first-neutral-position 18b, the gear 34 and tube 38 can be freewheeled by hand in either the first-rotational-direction 84 (see FIG. 17), or the second rotational direction 86 (see FIG. 18), therefore tightening or loosening the bind on the load while the bind is already loose, although, if the bind on the load is already tight and secure, freewheeling the gear 34 and the tube 38 by hand would be virtually impossible because of the tension on the ratchet binder 2 restricting rotational movement of the tube 38. The U-pawl 18 would need to be positioned into the first driving position 18a in order to tighten the bind on the load (this would happen automatically when the external force being applied to the U-pawl second arm 24 is removed), in order to loosen an already tightly bound load, a tool such as a pipe wrench would be necessary turn manually turn the tube 38 in the second-rotational-direction 86 to loosen the bind on the load when the blocking device 60 is installed in the first set of holes 52, all the while manually holding the U-pawl 18 in the first-neutral-position 18b to oppose the pressure from the first spring 10, creating a situation wherein the loosening of the bind on the load while the U-pawl 18 is in the first-neutral-position 18b is unlikely and difficult. Further security that the bind on the load would not be loosened when the U-pawl 18 is in the first-neutral-position 18b can be achieved by employing the recessed pawl 64 (see FIGS. 12 and 13).

FIG. 9 is a side elevation section view of the disclosed invention with the U-pawl 18 positioned in the second-driving-position 18c and schematically showing the position of the U-pawl 18 relative to the gear 34 and relative to the first-set of holes 52 and relative to the second-set of holes 54. The U-pawl 18 engaging the gear teeth root 36 and held firmly in the second-driving-position 18c by the first spring 10 while allowing the U-pawl first tooth 26 to flexibly move around the gear teeth roots 36 and gear teeth tips 37. The blocking device 60 (see FIG. 2 and FIG. 10) is not installed in the first-set of holes 52 or the second-set of holes 54, therefore, the U-pawl 18 may be moved out of the second-driving-position 18c with force.

Figure 10:
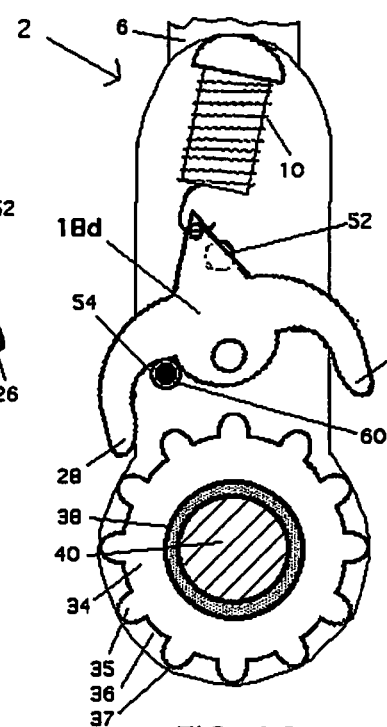
FIG. 10 is a side elevation section view of the disclosed invention schematically showing the position of the U-pawl relative to the gear and relative to the first-set and the second-set of holes. The U-pawl residing and held firmly in the second-neutral-position, the U-pawl is not in contact with the gear at any point of rotation of the gear. The blocking device is installed in the second-set of holes and not installed in the first-set of holes.

FIG. 10 is a side elevation section view of the disclosed invention second-neutral-position 18d schematically showing the position of the U-pawl 18 relative to the gear 34 and relative to the first-set of holes 52 and the second-set of holes 54. The U-pawl 18 residing in the second-neutral-position 18d. The U-pawl 18 is not in contact with the gear 34 and the U-pawl 18 is being held in the second-neutral-position 18d by the first spring 10, the first spring 10 is holding the U-pawl 18 against the blocking device 60, the blocking device 60 installed in the second set of holes 54. The second-neutral-position 18d is secure in its holding ability to allow the U-pawl 18 to stay in position while allowing the gear 34 and the tube 38 to be freewheeled by hand in either the first-rotational-direction 84 (see FIG. 17), or the second rotational direction 86 (see FIG. 18), therefore tightening or loosening the bind on the load while the bind is already loose, although, if the bind on the load is already tight and secure, freewheeling the gear 34 and the tube 38 by hand would be near impossible because of the tension on the tube 38. The blocking device 60 being installed in the second set of holes 54 would normally be done after the bind on the load has just been loosened and the ratchet chain binder 2 is ready to be removed from the truck bed and the load, the ratchet binder 2 would now be free wheeled and completely loosened for removal from the truck bed and from the load. Next the ratchet binder 2 could be stored with the blocking device 60 still locked in the second set of holes 54 during storage, then, when the next load is set to be bound on the truck bed, the ratchet binder 2 with the blocking device 60 still locked in the second set of holes 54 can be positioned on the truck bed and hooked to the load by itself of with the use of a chain, then the ratchet binder 2 can be freewheeled to remove the slack from the ratchet binder and/or the chain prior to removing the blocking device 60 from the second set of holes 54 and then installing the blocking device 60 into the first set of holes 52 to complete the final tightening of the ratchet binder to the load for transport of the load. With the blocking device 60 installed and locked in the first set of holes 52, the truck driver can check the tightness or tighten the ratchet binder 2 in the first-rotational-direction 84 (see FIG. 17) very easily without removing the blocking device 60 from the first set of holes 52, although to loosen the ratchet binder 2 without using additional tools such as a pipe wrench, the blocking device 60 would need to be removed from the first set of holes 52 to allow the U-pawl 18 to be forced into the second-driving-position 18*c* allowing the operator to use the handle assembly shaft 6 to loosen the bind on the load. As mentioned previously, further security that the bind on the load would not be loosened when the U-pawl 18 is in the first-neutral-position 18*b* can be achieved by employing the recessed pawl 64 (see FIGS. 12 and 13).

FIG. 11 is a side elevation section view of the disclosed invention middle-neutral-mode 18*e* schematically showing the position of the U-pawl 18 relative to the gear 34 and relative to the first-set of holes 53 and the second-set of holes 54. The U-pawl 18 residing in and not held firmly in the middle-neutral-position 18*e*. The blocking device is not installed in the first-set of holes 52 or the second-set of holes 54. The U-pawl 18 middle-neutral-position 18*e* is a balancing act on the U-pawl pivot axle 30, nudging the U-pawl 18 into first-driving-position 18*a* or into the second-driving-position 18*c* will result in the U-pawl 18 engaging the gear.

Figure 12:
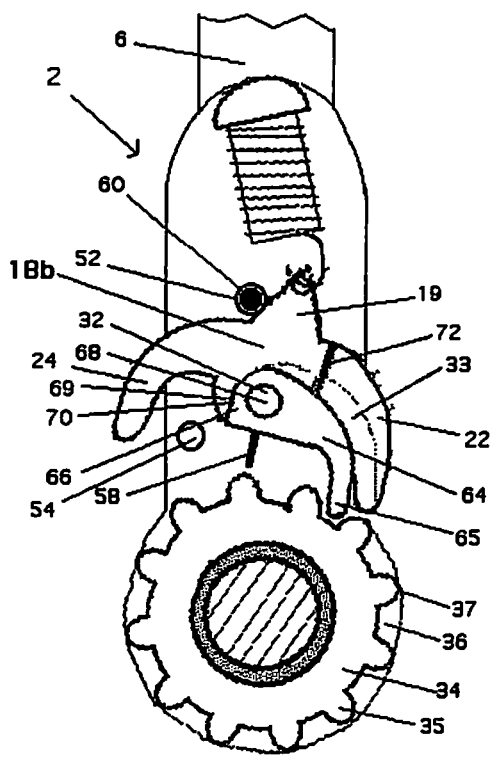
FIG. 12 is a side elevation section view of the disclosed invention schematically showing the first-set of holes and the second-set of holes for the blocking device and also showing the recessed-pawl pushed out of the recessed space of the U-pawl. The U-pawl residing in the first-neutral-position, the U-pawl is not in contact with the gear at any point of rotation of the gear. The blocking device is installed in the first-set of holes and not installed in the second-set of holes. The recessed pawl engaging the gear teeth root and held firmly in the first-driving-position.

FIG. 12 is a side elevation section view of the disclosed invention wherein the U-pawl 18 is positioned in the first-neutral-position 18*b* schematically showing the first-set of holes 52 and the second-set of holes 54, the blocking device 60 inserted in the first set of holes 52. The recessed-pawl 64 is shown engaging the gear teeth root 36 as the U-pawl 18 is being forcefully held in the first-neutral-position 18*b*, the blocking device 60 keeping the U-pawl 18 first tooth 26 from moving more than ⅛ inch away from the gear tooth tip 37 outside of the gear 34 diameter. The recessed-pawl 64 pivots on the U-pawl pivot axle 30 (see FIG. 2). The recessed-pawl 64 pivots partially independently from the pivot action of the U-pawl 18. The U-pawl 18 recessed space 33 is shown in the gear facing side of the first tooth 26 and wherein the recessed space 33 encircles the pivot axle 30 of the U-pawl 18 while partially recessing into the second arm 24 of the U-pawl 18. The recessed-pawl 64 comprises a single tooth 65 and the recessed-pawl 64 is partially or fully recessed in the recessed space 33 of the U-pawl 18, the recessed-pawl arm 66 and the recessed-pawl tooth 65 able to move in and out of the recessed space 33 of the U-pawl, the recessed-pawl arm 66 and the recessed-pawl tooth 65 constantly being pressured and pushed towards the gear 34 by a second spring 72 supported by the U-pawl 18, the recessed-pawl 64 utilizing the same U-pawl for a pivot axle 30 as the U-pawl for a pivot point, the recessed-pawl 64 being pushed towards and making contact with the gear 34 somewhere including of and between the gear teeth tips 37 and the gear teeth roots 36 when the U-pawl 18 first tooth 26 is within ⅛ inch or less of the gear teeth tips 37 outside of the gear diameter; The recessed-pawl 64 is shown moved out of the U-pawl recessed space 33 and into the gear teeth root 36 by the force of the second spring 74. The second spring 74 being recessed into the U-pawl first arm 22 by a hole drilled into the underside of U-pawl first arm 22. The U-pawl head 19 is shown held against the blocking device 60 and cannot move beyond the blocking device 60. The obstruction tab 58 is shown rigidly attached to the underside of the U-pawl 18 and does not come in contact with the gear 34 in any position the U-pawl 18 is in. The obstruction tab 58 deters tampering with the recessed-pawl 64 when the recessed-pawl 64 is engaged with the gear teeth roots 36 and when the U-pawl 18 is not engaged with the gear teeth roots 36. The recessed-pawl 64 prevents the tube from moving in the second-rotational-direction 86 (see FIG. 18) when the recessed-pawl 64 is engaged with the gear teeth roots 36 while the blocking device 60 is inserted in the first-set of holes 52. The recessed-pawl 64 utilizing a U-pawl stop surface 69 that mates with a surface of the recessed-pawl 64 to stop the pivot of the recessed-pawl 64 at any point in excess of the measurement from the fully recessed position of the recessed-pawl 64 tooth in the recessed space 33 of the U-pawl 18 to an aligned gear teeth root 36 when the U-pawl 18 is held in the first-neutral-position 18*b* (see FIG. 12) and wherein the U-pawl first tooth 26 is at least ⅛ inch away from the gear teeth tips 37 outside of the gear 34 diameter, the recessed-pawl 64 preventing the tube 38 from turning in the second-rotational-direction 86 (see FIG. 18) if the U-pawl 18 if held in the first-neutral-position 18*b* while the U-pawl 18 first tooth 26 maintains a position of ⅛ inch or less from the gear teeth tips 37 outside of the gear 34 diameter.

Figure 17:
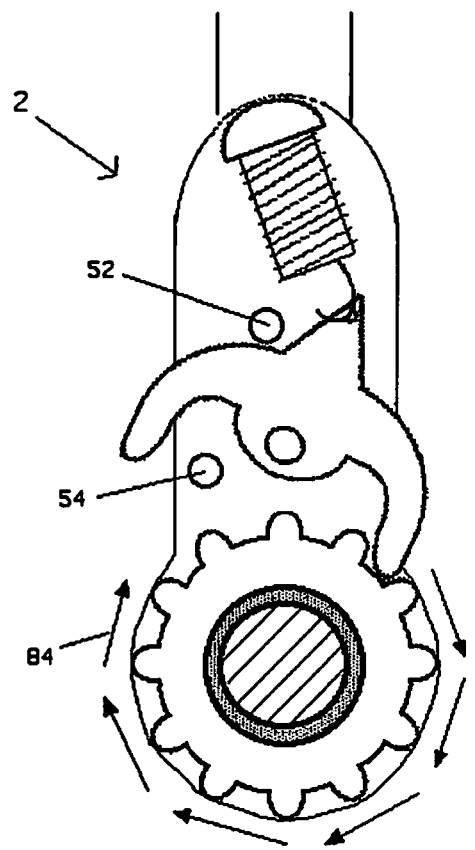
FIG. 17 is a side elevation section view of the disclosed invention first-rotational-direction of the gear and the tube.

The first spring 10 will exert more force than the second spring 72 resulting in the recessed-pawl 64 remaining substantially recessed in the U-pawl 18 during the ratchet turning of the tube in the first-rotational-direction 84 (see FIG. 17). The first spring 10 exerting substantial force on the U-pawl 18 to quickly engage the U-pawl 18 in the gear teeth roots 36 when the U-pawl 18 and the recessed-pawl 64 are moving around the gear teeth 35 while ratchet turning the tube 38 in the first-rotational-direction 84. To aid the recessed-pawl 64 to remain substantially recessed in the U-pawl recessed space 33 during ratchet turning the tube 38 in the first-rotational-direction 84, the recessed-pawl 64 will be the same length or slightly longer in length than the U-pawl first arm 22 resulting in both the recessed-pawl 64 and the U-pawl first arm 22 dropping off of the gear teeth tips 37 at the same time and then moving to the gear teeth roots 36 to engage the gear 34 and then turn the tube 38 in the first-rotational-direction 84. The obstruction tab 58 is shown clear of the gear teeth 35 while the U-pawl 18 is in the first-neutral-position 18*b*. The obstruction tab 58 will deter an outside force such as a screwdriver from pushing the recessed-pawl 64 back into the U-pawl recessed space 33 therefore removing the recessed-pawl 64 engagement from the gear teeth 35. If the recessed-pawl 64 is removed from the engagement of the gear teeth 35, the tube 38 can freewheel turn in either the first-rotational-direction 84 or the second-rotational-direction 86.

Figure 13:
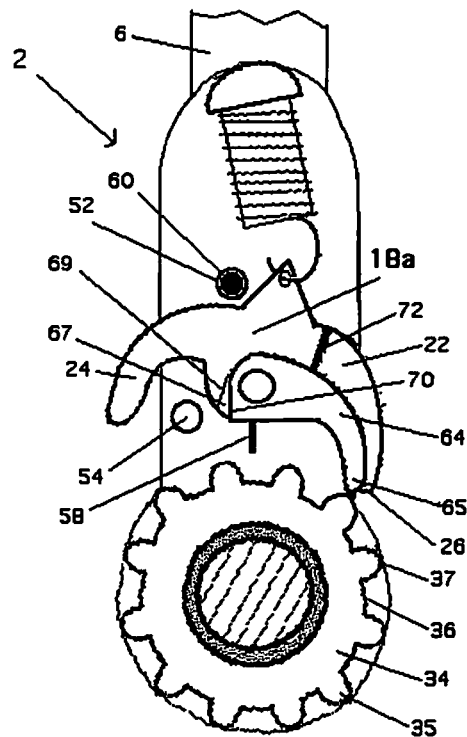
FIG. 13 is a side elevation section view of the disclosed invention schematically showing the first-set of holes and the second-set of holes, the blocking device inserted in the first set of holes. The U-pawl residing in the U-pawl first-driving-position. The recessed pawl recessed in the U-pawl as the recessed-pawl resides on a gear tooth tip.

FIG. 13 is a side elevation section view of the disclosed invention schematically showing the first-set of holes 52 and the second-set of holes 54, the blocking device 60 inserted in the first set of holes 52. The U-pawl 18 residing in the first-driving-position 18*a* with both the recessed-pawl tooth 65 and the U-pawl first tooth 26 moving across the gear teeth tips 37, the recessed-pawl 64 being recessed in the U-Pawl recessed space 33. The U-pawl head 19 is not in contact with the blocking device 60 during the normal operation of the U-pawl first driving position 80. The recessed-pawl stop surface 70 is not engaged with the U-pawl stop surface 69 when the recessed-pawl 64 is recessed in the U-pawl 18. When the recessed-pawl stop surface 70 is engaged with the U-pawl stop surface 69, the recessed pawl 64 will be extended out of the U-Pawl recessed space 33 until the two stop surfaces 70 and 69 meet. (See FIG. 12) The U-Pawl recessed space 33 is shown on the U-pawl second arm 24 side of the U-pawl 18. The U-pawl 18 comprises an obstruction tab 58 attached to the gear 34 facing second arm 24 portion of the U-pawl 18, the obstruction tab 58 discouraging the manually pushing of the recessed-pawl tooth 65 into the recessed space 33 of the U-pawl 18 when the U-pawl 18 is held in the first-neutral-position 18b and when the U-pawl 18 first tooth 26 is within ⅛ inch of the gear teeth tips 37 outside of the gear 34 diameter.

Figure 14:
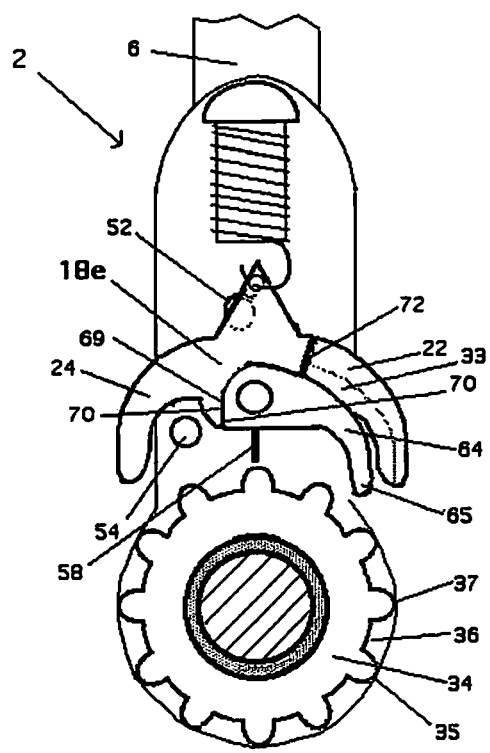
FIG. 14 is a side elevation section view of the disclosed invention schematically showing the first-set of holes and the second-set of holes, the U-pawl residing in the U-pawl middle-neutral-position. The second spring is shown in an extended position while the recessed-pawl is pushed out of the U-pawl recessed space.
Figure 18:
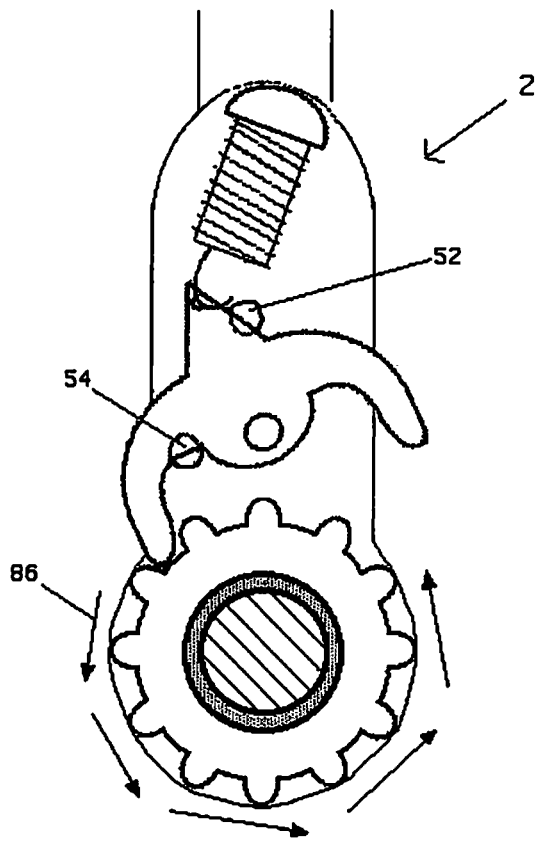
FIG. 18 is a side elevation section view of the disclosed invention second-rotational-direction of the gear and the tube.

FIG. 14 is a side elevation section view of the disclosed invention schematically showing the first-set of holes 52 and the second-set of holes 54, the U-pawl 18 residing in the U-pawl middle-neutral-position 18e allowing the gear 34 to be uninhibited from the U-Pawl 18 and the gear 34 able to freewheel turn in either the first-rotational-direction 84 (see FIG. 17) or the second-rotational-direction 86 (see FIG. 18). The recessed-pawl stop surface 70 is engaged with the U-pawl stop surface 69 when the recessed-pawl 64 is not recessed in the U-pawl recessed space 33 (see FIG. 16). The obstruction tab 58 is shown rigidly attached to the underside of the U-pawl 18 and does not come in contact with the gear 34 in any position the U-pawl 18 is in. The second spring 72 is shown in an extended position while the recessed-pawl 64 is pushed out of the U-pawl recessed space 33. The middle-neutral-position 18e of the U-pawl 18 is not securely held in position and if the U-pawl 18 is positioned in the middle-neutral-position 18e the U-pawl 18 is likely to move to the first-driving-position 18a or the second-driving-position 18c with a slight nudge towards the corresponding position (18a or 18c), in addition, if the U-pawl 18 is located in the first-neutral-position 18b or the second-neutral-position 18d and if the U-pawl 18 is not held in place by an exterior force or object, the U-pawl 18 will move into the corresponding first-driving-position 18a or the second-driving-position 18c by the first spring 10 pressure on the U-pawl 18.

Figure 15:
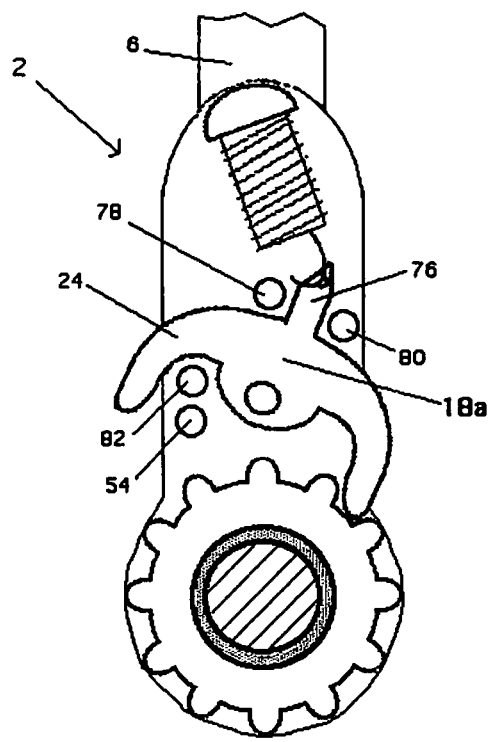
FIG. 15 is a side elevation section view of the disclosed invention first-driving-position schematically showing the U-pawl head narrow shape and three alternate locations of the first set of holes.

FIG. 15 is a side elevation section view of the disclosed invention first-driving-position 18a schematically showing the U-pawl head narrow shape 76 and three alternate locations for the first set of holes 52 (see FIG. 13). The first set of holes, first alternate location 78 is the closest to the original first set of holes 52 (see FIG. 13) and is positioned near the U-pawl head, narrow shape 76. The first set of holes, second alternate location 80 is positioned on the opposing side of the U-pawl head, narrow shape 76. The first set of holes, third alternate location 82 is positioned below the U-pawl second arm 24.

Figure 16:
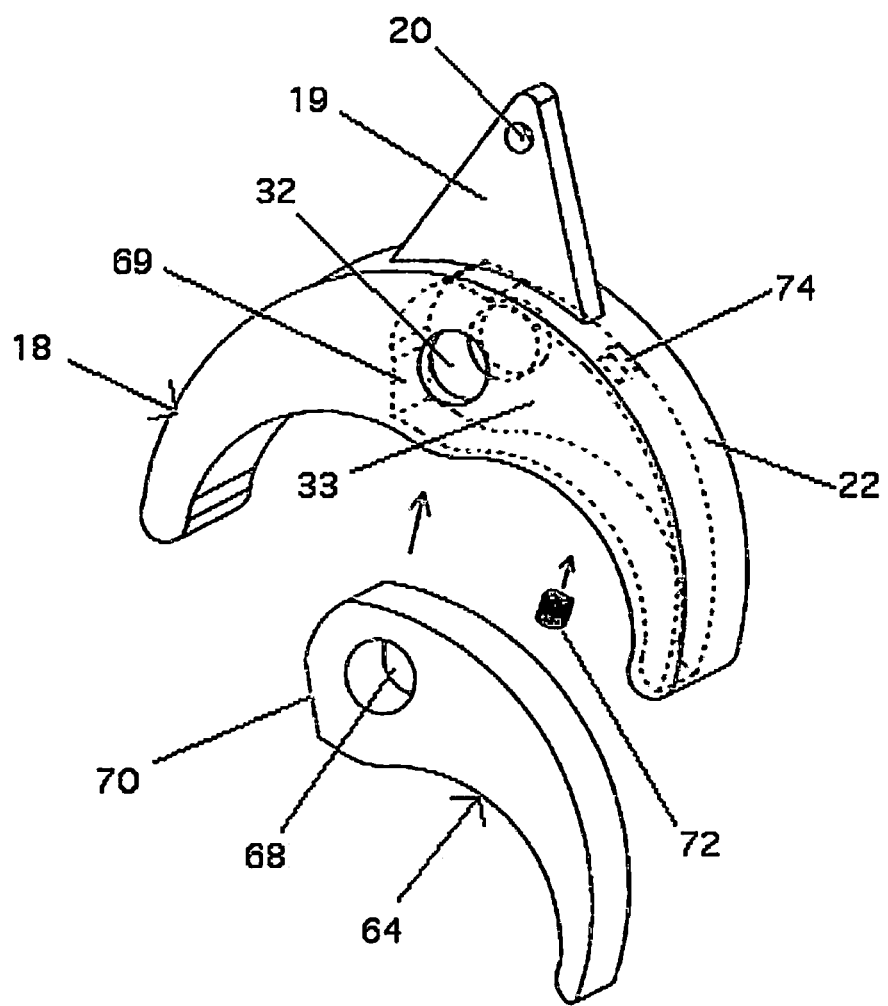
FIG. 16 is a perspective view of the U-pawl and the recessed-pawl showing the position of the U-Pawl recessed space.

FIG. 16 is a perspective view of the U-pawl 18 and the recessed-pawl 64 showing the position of the U-Pawl recessed space 33. The second spring insertion hole 74 is shown in the U-pawl 18, this hole can be a drilled hole drilled from the underside of the U-pawl 18 stopping just underneath the surface of the U-pawl 18 requiring the second spring 72 to be inserted between the U-pawl 18 and the recessed-pawl 64 while the two pawls are disassembled. In an alternative drilling of the second spring insertion hole 74 and insertion of the second spring 72, the hole can be drilled through the top portion of the U-pawl 18 all the way through and into the U-Pawl recessed space 33 allowing for the second spring 72 to be inserted in the second spring insertion hole 74 while the U-pawl 18 and the recessed-pawl 64 are assembled together, then after the second spring 72 is inserted in the second spring insertion hole 74 a plug can be installed above the spring and secured level with the top of the U-pawl 18. The U-pawl recessed space 33 encircles a portion of the U-pawl pivot hole 32 allowing the recessed-pawl 64 to fit in the U-pawl recessed space 33 while leaving enough material in the U-pawl first arm 22 to maintain a sturdy structure. The U-pawl stop surface 69 is shown in the U-pawl recessed space 33 and the recessed-pawl stop surface is shown on the recessed-pawl 64. The U-pawl head 19 is shown mounted to the top of the U-pawl 18 with the U-pawl eyelet 20 at the top of the U-pawl head 19. The recessed-pawl pivot hole 68 will align with the U-pawl pivot hole 32.

FIG. 17 is a side elevation section view of the disclosed invention first-rotational-direction 84 of the gear and the tube.

FIG. 18 is a side elevation section view of the disclosed invention second-rotational-direction 86 of the gear and the tube.

Figure 19:
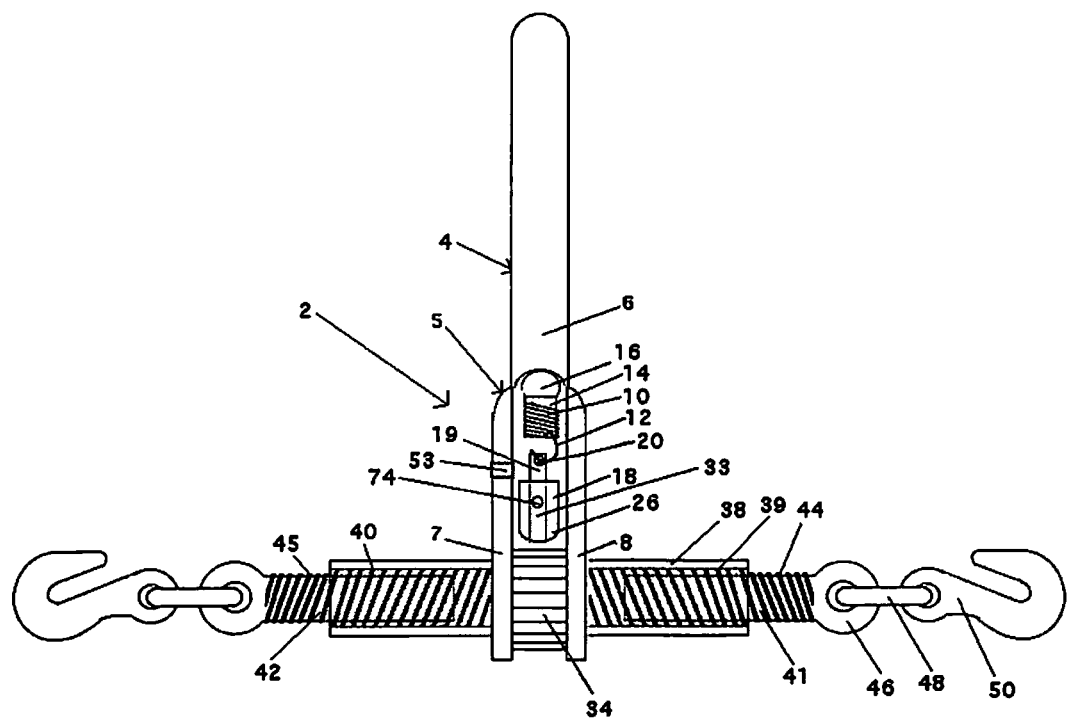
FIG. 19 is a front elevation view of the disclosed invention schematically showing the interior parts between the two sides of the ratchet load binder and showing the first hole in the handle assembly first side.

FIG. 19 is a front elevation view of the disclosed invention schematically showing the interior parts between the two sides of the ratchet load binder and showing the first hole 53 in the handle assembly first side 7. The first hole 53 generally is a threaded hole to accommodate and hold the blocking device 60 in place. A blocking device 60 that can be used to insert in the first hole 53 may be a threaded bolt comprising a bolt head wherein the bolt head has a unique configuration that requires a tool with the same unique configuration to mate with the bolt head to securely install and remove the bolt. The first-hole positioned in the handle assembly side 7 for the insertion of a blocking device 60 wherein the insertion of the blocking device 60 in the first-hole 53 prevents the U-pawl 18 from pivoting from the first-driving-position 18a into or beyond the middle-neutral-position 18e while allowing the U-pawl 18 movement in the first-driving-position 18a wherein the U-pawl 18 first tooth 26 has no more than ⅛ inch of clearance away from the gear teeth tips 37 (see FIG. 4) outside of the gear 34 diameter, and wherein the inserted blocking device 60 allows normal back and forth operation of the U-pawl 18 in the first-driving-position 18a while ratchet turning the tube 38 in the first-rotational-direction 84. Insertion of the blocking device 60 in the first-hole 53 and if the U-pawl 18 is held against the blocking device 60, creates:

i. a first-neutral-position 18b (see FIG. 8) of the U-pawl, the first-neutral-position 18b allowing freewheeling of the tube 38 in either direction and creating a clearance of the U-pawl 18 first arm 22 of about ⅛ inch or less from the gear teeth tips 37 (see FIG. 4).

Figure 20:
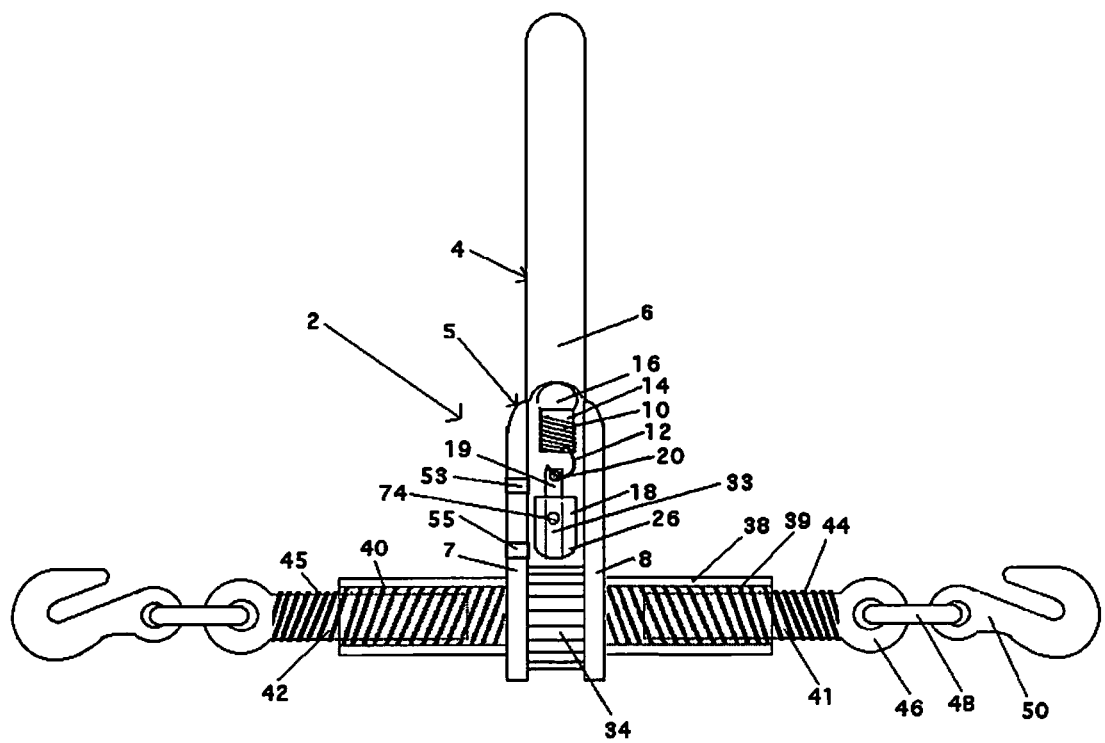
FIG. 20 is a front elevation view of the disclosed invention schematically showing the interior parts between the two sides of the ratchet load binder and showing the second hole in the handle assembly first side.

FIG. 20 is a front elevation view of the disclosed invention schematically showing the interior parts between the two sides of the ratchet load binder and showing the first hole 53 and the second hole 55 in the handle assembly first side 7. The first hole 53 and the second hole 55 generally are threaded holes to accommodate and hold the blocking device 60 in place. A blocking device 60 that can be used to insert in the first hole 53 and the second hole 55 may be a threaded bolt comprising a bolt head wherein the bolt head has a unique configuration that requires a tool with the same unique configuration to mate with the bolt head to securely install and remove the bolt. The second-hole 55 positioned in the handle assembly sides 7+8 for the insertion of the blocking device 60 and wherein the insertion of the blocking device 60 in the second-hole 55 prevents the U-pawl 18 from pivoting to the second-driving-position 18c (see FIG. 9) when the U-pawl 18 resides in either i) the first-driving-position 18a, ii) the first-neutral-position 18b, or iii) the middle-neutral-position 18e, and wherein the inserted blocking device 60 allows normal back and forth operation of the U-pawl 18 in the first-driving-position 18a while ratchet turning the tube in the first-rotational-direction 84, and when the blocking device 60 is inserted and the U-pawl 18 is positioned against the blocking device 60, it creates:

i. a second-neutral-position 18d (see FIG. 10) of the U-pawl 18, the second-neutral-position 18d allowing freewheeling of the tube 38 in either direction, the U-pawl 18 will remain securely in the second-neutral-position 18d, the first spring 10 and the inserted blocking device 60 maintaining the U-pawl 18 position in the second-neutral-position 18d unless the U-pawl 18 is manually moved from the second-neutral-position 18d.

Figure 21:
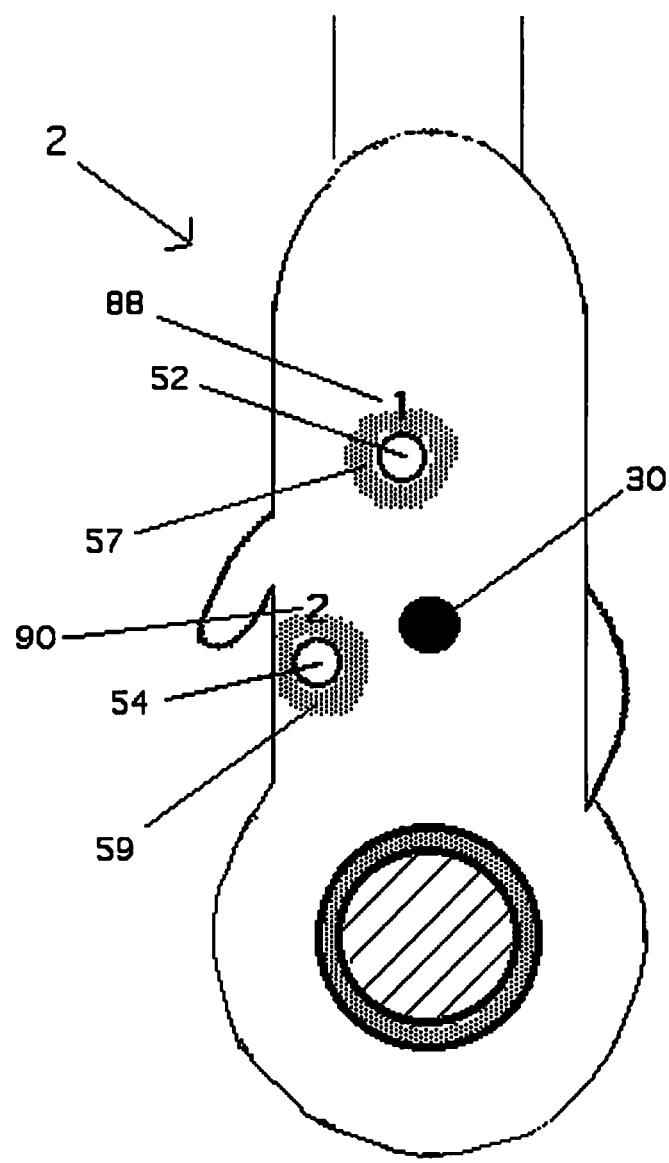
FIG. 21 is a side elevation view of the disclosed invention showing the color-coding of the first-set of holes and the second-set of holes.

FIG. 21 shows the disclosed invention with first hole color-coding 57 around the first-set of holes 52 and the second holes color-coding 59 around the second-set of holes 54, and also shows a first hole numeral 88 designation and a second hole numeral 90 designation. The color-coding 57+59 placed on the handle assembly U-pawl housing 5 around each corresponding hole with different colors to visually distinguish the first-set of holes 52 from the second set of holes 54, and the numerals 88+90 placed on the handle assembly U-pawl housing 5 around each corresponding hole with different numerals to visually distinguish the first-set of holes 52 from the second set of holes 54. Either or both the color-coding and the numeral designations can be used.

Functionality of the Related Parts of the Disclosed Invention:

The first set of holes 52 and the second set of holes 54 can have multiple alternative positions to achieve the same results of the inserted blocking device 60. The equivalent alternate positions of the first set of holes 52 can also be applied to alternative positions for the second set of holes 54.

The foregoing detailed description is given primarily for clearness of understanding and no unnecessary limitations are to be understood therefrom, for modification will become obvious to those skilled in the art upon reading this disclosure and may be made without departing from the spirit of the invention and scope of the appended claims. Accordingly, this invention is not intended to be limited by the specific exemplification presented herein above. Rather, what is intended to be covered is within the spirit and scope of the appended claims.

What is claimed is:

1. A ratchet load binder comprising:
    a) an elongated tube having opposing open ends and internal threads, a first end having right-hand internal threads and a second end having left-hand internal threads, a gear encircling the tube, the gear rigidly attached to the tube, the gear having externally facing teeth;
    b) a first rod comprising right hand external threads mating to the threads in the first end of the tube, the threads starting at a first end of the rod and extending along the rod, a second rod comprising left hand external threads mating to the threads in the second end of the tube, the threads starting at a first end of the rod and extending along the rod, the first rod threading into the first end of the tube, the second rod threading into the second end of the tube, the tube movable in a first-rotational-direction and the tube movable in a second-rotational-direction, the first-rotational-direction of the tube moves the rods closer to each other while the rods are stationary in rotation, the second-rotational-direction of the tube moves the rods farther away from each other while the rods are stationary in rotation, each second end of each rod having a connection device;
    c) a handle assembly comprising a shaft and two separated sides, the sides rotatably mounted around the tube to rotate completely around the tube while straddling the gear, the handle assembly generally perpendicular to the tube, the handle assembly having a first side positioned on one side of the gear and a second side positioned on the opposing side of the gear, the handle assembly first and second sides encircling the tube;
    d) a pivotal attached U-shaped-pawl referred herein as a U-pawl with a first tooth on one end of the U-pawl and a second tooth on the opposing end of the U-pawl, the first tooth for driving rotation of the tube in the first-rotational-direction and the second tooth for driving the rotation of the tube in the second-rotational-direction, the U-pawl teeth for engaging the gear teeth, the U-pawl attached to the handle assembly between the first side and the second side, the U-pawl pivoting on an axle inserted at a pivot hole on the U-pawl, the axle being attached to the handle assembly first side and the second side that straddles the gear, a pivot axle on the U-pawl being generally centered between the first tooth and the second tooth of the U-pawl, the U-pawl comprising;
        i) a first-driving-position;
        ii) a second-driving-position;
        iii) a middle-neutral-position, and wherein either i) the middle-neutral-position is not securely held in position, or ii) the middle-neutral-position is securely held in position;
    e) a means for applying flexible pressure on the U-pawl causing the U-pawl to be held securely in either the first-driving-position or the second-driving-position, the means for applying flexible pressure on the U-pawl keeping the U-pawl first tooth or the second tooth engaged with the gear teeth during ratcheting rotation of the tube, the means for applying flexible pressure on the U-pawl allowing flexible pivotal movement of the U-pawl first tooth or the second tooth around gear teeth roots and gear teeth tips for incremental back and forth movement of the handle assembly and the U-pawl during a ratcheting rotational movement of the tube, wherein moving the U-pawl from the first-driving-position to the second-driving-position or vice versa requires the U-pawl to be manually and forcefully pivoted; and
    f) means for the insertion of a blocking device in the handle assembly wherein the insertion of the blocking device in the handle assembly prevents the U-pawl from pivoting from the first-driving-position into the second-driving-position while allowing the U-pawl movement in the first-driving-position, and wherein the inserted blocking device allows normal back and forth operation of the U-pawl in the first-driving-position while ratchet turning the tube in the first-rotational-direction.

2. A system comprising:
    a) the ratchet load binder of claim 1; and
    b) the blocking device inserted in the means for the insertion of the blocking device, thereby the blocking device blocking the U-Pawl from moving into the second driving position.

3. The system of claim 2 wherein the blocking device is provided with i) a tamper or theft deterrence feature, or ii) a tamper and theft deterrence feature.

4. The system of claim 3 wherein the tamper or the theft deterrence feature is a lock shackle.

5. The system of claim 4 wherein the lock shackle is a component of a padlock.

6. The system of claim 2 wherein the blocking device is extendable and retractable.

7. The ratchet load binder of claim 1 wherein the middle-neutral-position of the U-pawl is not securely held in position and if the U-pawl is positioned in the middle-neutral-position the U-pawl is likely to move to the first-driving-position or the second-driving-position with a slight nudge towards the corresponding position, in addition, if the U-pawl is located in a first-neutral-position or a second-neutral-position and if the U-pawl is not held in place by an exterior force or object, the U-pawl will move into the corresponding first-driving-position or the second-driving-position by the means for applying flexible pressure on the U-pawl.

8. The ratchet load binder of claim 1 wherein the connection device is an eyelet connector.

9. The ratchet load binder of claim 1 wherein the connection device is releasable.

10. The ratchet load binder of claim 9 wherein the connection device is a hook.

11. The ratchet load binder of claim 1 wherein the connection device is flexible.

12. The ratchet load binder of claim 1 wherein the means for the insertion of the blocking device comprises one or two holes provided through one or both of the sides of the handle assembly.

13. The ratchet load binder of claim 12 wherein one of the hole is a first hole and another of the hole is a second hole.

14. The ratchet load binder of claim 1 wherein the means for the insertion of the blocking device comprises an aligned first-set of two holes and an aligned second-set of two holes therethrough the two sides of the handle assembly.

15. The ratchet load binder of claim 1 wherein:
 a) the means for applying flexible pressure on the U-pawl comprises a first spring, and wherein:
  i) the first spring being secured in the handle assembly; and
  ii) pivoting the U-pawl initially contracts the first spring while moving the U-pawl towards the middle-neutral-position, and
  iii) then expands the first spring when the U-pawl moves past the middle-neutral-position to the opposing driving position.

16. The ratchet load binder of claim 15 further comprising wherein the first spring is wrapped around a stabilizer stem with a ball end, the ball end of the stem pivoting in the handle assembly allowing pivotal movement of the first spring.

17. The ratchet load binder of claim 15 wherein the means for the insertion of the blocking device comprises one or two holes provided through one or both of the sides of the handle assembly.

18. The ratchet load binder of claim 17 wherein one of the hole is a first hole and another of the hole is a second hole.

19. The ratchet load binder of claim 18 wherein the insertion of the blocking device in the first hole prevents the U-pawl from pivoting from the first-driving-position into or beyond the middle-neutral-position while allowing the U-pawl movement in the first-driving-position, wherein the U-pawl first tooth has no more than about ⅛ inch of clearance away from the gear teeth tips outside of a gear diameter, and wherein the inserted blocking device allows normal back and forth operation of the U-pawl in the first-rotational-direction while ratchet turning the tube in the first-rotational-direction, and if the U-pawl is held against the blocking device, creates;
 i) a first-neutral-position of the U-pawl, the first-neutral-position allowing freewheeling of the tube in either direction and creating a clearance of a U-pawl first arm of about ⅛ inch or less from the gear teeth tips.

20. The ratchet load binder of claim 19 wherein the U-pawl further comprises a recessed space in the gear facing side of the first arm, and the ratchet load binder comprises a recessed-pawl with a single tooth wherein the recessed-pawl is partially or fully recessed in the recessed space of the U-pawl, a recessed-pawl arm and a recessed-pawl tooth able to move in and out of the recessed space of the U-pawl, the recessed-pawl arm and recessed-pawl tooth constantly being pressured and pushed towards the gear by a second spring supported by the U-pawl, the recessed-pawl being pushed towards and making contact with the gear somewhere including of and between the gear teeth tips and the gear teeth roots when the U-pawl first tooth is within ⅛ inch or less of the gear teeth tips outside of the gear diameter, the recessed-pawl utilizing a U-pawl stop surface that mates with a surface of the recessed-pawl to stop a pivot of the recessed-pawl at any point in excess of a measurement from a fully recessed position of the recessed-pawl tooth in the recessed space of the U-pawl to an aligned gear teeth root when the U-pawl is held in the first-neutral-position and wherein the U-pawl first tooth is at least ⅛ inch away from the gear teeth tips outside of the gear diameter, the recessed-pawl preventing the tube from turning in the second-rotational-direction if the U-pawl if held in the first-neutral-position while the U-pawl first tooth maintains a position of ⅛ inch or less from the gear teeth tips outside of the gear diameter.

21. The ratchet load binder of claim 20 wherein the U-pawl comprises an obstruction tab attached to the gear facing second arm portion of the U-pawl, the obstruction tab discouraging a manually pushing of the recessed-pawl tooth into the recessed space of the U-pawl when the U-pawl is held in the first neutral position and when the U-pawl first tooth is about within ⅛ inch of the gear teeth tips outside of the gear diameter.

22. The ratchet load binder of claim 17 wherein two of the holes are provided through one of the side of the handle assembly, and the two holes are threaded.

23. A system comprising:
 a) the ratchet load binder of claim 18; and
 b) the blocking device inserted in the first hole or into the second hole, thereby the blocking device blocking the U-Pawl from moving into the second driving position.

24. The system of claim 23 wherein the blocking device is provided with i) a tamper or theft deterrence feature, or ii) a tamper and theft deterrence feature.

25. The system of claim 24 wherein the tamper or the theft deterrence feature is a lock shackle.

26. The ratchet load binder of claim 18 wherein an areas on the handle assembly U-pawl housing around each of the first hole and around each of the second hole are either i) color-coded with different colors, ii) marked with numerals, or iii) both color-coded with different colors and marked with numerals, to visually distinguish each of the first hole from each of the second hole.

27. The ratchet load binder of claim 18 wherein the insertion of the blocking device in the second hole prevents the U-pawl from pivoting to the second-driving-position when the U-pawl resides in either i) the first-driving-position, or ii) a first-neutral-position, or iii) the middle-neutral-position, and wherein the inserted blocking device allows normal back and forth operation of the U-pawl in the first-driving-position while ratchet turning the tube in the first-rotational-direction, and when the U-pawl is positioned against the inserted blocking device, it creates;
  i) a second-neutral-position of the U-pawl,
    the second-neutral-position allowing freewheeling of the tube in either direction, the U-pawl will remain securely in the second-neutral-position, the first spring and the inserted blocking device maintaining the U-pawl position in the second-neutral-position unless the U-pawl is manually moved from the second-neutral-position.

28. The ratchet load binder of claim 20 wherein the recessed space encircles the pivot axle of the U-pawl while partially recessing into a second arm of the U-pawl, the recessed-pawl utilizing the same pivot axle as the U-pawl for a pivot point.

29. The ratchet load binder of claim 15 wherein the means for the insertion of the blocking device comprises an aligned first-set of two holes and an aligned second-set of two holes therethrough the two sides of the handle assembly.

30. The ratchet load binder of claim 29 wherein the insertion of the blocking device in the aligned first-set of two holes prevents the U-pawl from pivoting from the first-driving-position into or beyond the middle-neutral-position while allowing the U-pawl movement in the first-driving-position, wherein the U-pawl first tooth has no more than about ⅛ inch of clearance away from the gear teeth tips outside of a gear diameter, and wherein the inserted blocking device allows normal back and forth operation of the U-pawl in the first-driving-position while ratchet turning the tube in the first-rotational-direction, and when the U-pawl is held against the inserted blocking device, it creates;
  i) a first-neutral-position of the U-pawl,
    the first-neutral-position allowing freewheeling of the tube in either direction and creating a clearance of a U-pawl first arm of about ⅛ inch or less from the gear teeth tips.

31. The ratchet load binder of claim 29 wherein the insertion of the blocking device in the aligned second-set of two holes prevents the U-pawl from pivoting to the second-driving-position when the U-pawl resides in either i) the first-driving-position, or ii) a first-neutral-position, or iii) the middle-neutral-position, and wherein the inserted blocking device allows normal back and forth operation of the U-pawl in the first-driving-position while ratchet turning the tube in the first-rotational-direction, and when the U-pawl is positioned against the blocking device, it creates:
  i) a second-neutral-position of the U-pawl,
the second-neutral-position allowing freewheeling of the tube in either direction, the U-pawl will remain securely in the second-neutral-position, the first spring and the inserted blocking device maintaining the U-pawl position in the second-neutral-position unless the U-pawl is manually moved from the second-neutral-position.

32. The ratchet load binder of claim 29 wherein an areas on the handle assembly U-pawl housing around the first-set of holes and around the second-set of holes are either, i) color-coded with different colors, ii) marked with numerals, or iii) both color-coded with different colors and marked with numerals, to visually distinguish the first-set of holes from the second-set of holes.

33. The ratchet load binder of claim 29 wherein the first-set of two holes and the second-set of two holes each comprise one threaded hole and one non-threaded hole.

34. A system comprising:
  a) the ratchet load binder of claim 29; and
  b) the blocking device inserted into the aligned first-set of two holes or into the aligned second-set of two holes blocking the U-pawl from moving into the second-driving-position.

35. The system of claim 34 wherein the blocking device is provided with i) a tamper or theft deterrence feature, or ii) a tamper and theft deterrence feature.

36. The system of claim 35 wherein the tamper or the theft deterrence feature is a lock shackle.

37. The ratchet load binder of claim 30 wherein the U-pawl further comprises a recessed space in the gear facing side of the first arm, and the ratchet load binder comprises a recessed-pawl with a single tooth wherein the recessed-pawl is partially or fully recessed in the recessed space of the U-pawl, a recessed-pawl arm and a recessed-pawl tooth able to move in and out of the recessed space of the U-pawl, the recessed-pawl arm and the recessed-pawl tooth constantly being pressured and pushed towards the gear by a second spring supported by the U-pawl, the recessed-pawl being pushed towards and making contact with the gear somewhere including of and between the gear teeth tips and the gear teeth roots when the U-pawl first tooth is within about ⅛ inch or less of the gear teeth tips outside of the gear diameter, the recessed-pawl utilizing a U-pawl stop surface that mates with a surface of the recessed-pawl to stop a pivot of the recessed-pawl at any point in excess of a measurement from a fully recessed position of the recessed-pawl tooth in the recessed space of the U-pawl to an aligned gear teeth root when the U-pawl is held in the first-neutral-position and wherein the U-pawl first tooth is at least about ⅛ inch away from the gear teeth tips outside of the gear diameter, the recessed-pawl preventing the tube from turning in the second-rotational-direction if the U-pawl if held in the first-neutral-position while the U-pawl first tooth maintains a position of about ⅛ inch or less from the gear teeth tips outside of the gear diameter.

38. The ratchet load binder of claim 37 wherein the U-pawl comprises an obstruction tab attached to the gear facing second arm portion of the U-pawl, the obstruction tab discouraging a manually pushing of the recessed-pawl tooth into the recessed space of the U-pawl when the U-pawl is held in the first neutral position and when the U-pawl first tooth is about within ⅛ inch of the gear teeth tips outside of the gear diameter.

39. The ratchet load binder of claim 37 wherein the recessed space encircles the pivot axle of the U-pawl while partially recessing into a second arm of the U-pawl, the recessed-pawl utilizing the same pivot axle as the U-pawl for a pivot point.

40. A ratchet load binder comprising:
  a) an elongated tube having opposing open ends and internal threads, a first end having right-hand internal threads and a second end having left-hand internal threads, and a gear encircling the tube, the gear rigidly attached to the tube, the gear having externally facing teeth;
  b) a first rod comprising right hand external threads mating to the threads in the first end of the tube, the threads starting at a first end of the rod and extending along the rod, a second rod comprising left hand external threads mating to the threads in the second end of the tube, the threads starting at a first end of the rod and extending along the rod, the first rod threading into the first end of the tube, the second rod threading into the second end of the tube, the tube movable in a first-rotational-direction and the tube movable in a second-rotational-direction, the first-rotational-direction of the tube moves the rods closer to each other while the rods are stationary in rotation, the second-rotational-direction of the tube moves the rods farther away from each other while the rods are stationary in rotation, each second end of each rod having a connection device;

c) a handle assembly comprising a shaft and two separated sides, the sides rotatably mounted around the tube to rotate completely around the tube while straddling the gear, the handle assembly generally perpendicular to the tube, the handle assembly having a first side positioned on one side of the gear and a second side positioned on the opposing side of the gear, the handle assembly the first and second sides encircling the tube;

d) a pivotal attached U-shaped-pawl referred herein as a U-pawl with a first tooth on one end of the U-pawl and a second tooth on the opposing end of the U-pawl, the first tooth for driving the rotation of the tube in the first-rotational-direction and the second tooth for driving the rotation of the tube in the second-rotational-direction, the U-pawl teeth for engaging the gear teeth, the U-pawl attached to the handle assembly between the first and second sides, the U-pawl pivoting on a pin inserted at a pivot point on the U-pawl, the pin being attached to the handle assembly the first and second sides that straddle the gear, the pivot point on the U-pawl being generally centered between the first and the second teeth of the U-pawl, the U-pawl comprising;
  i) a first-driving-position;
  ii) a second-driving-position;
  iii) a middle-neutral-position, and wherein either i) the middle-neutral-position is not securely held in position, or ii) the middle-neutral-position is securely held in position;

e) a first spring applying flexible pressure on the U-pawl causing the U-pawl to be held securely in either the first-driving-position or the second-driving-position, the first spring being secured in the handle assembly, the first spring keeping the U-pawl first tooth or the second tooth engaged with the gear teeth during ratcheting rotation of the tube, the first spring allowing flexible pivotal movement of the U-pawl first or the second tooth around gear teeth roots and tips for incremental back and forth movement of the handle and the U-pawl during a ratcheting rotational movement of the tube while maintaining the U-pawl first or second tooth in contact with the gear, and wherein moving the U-pawl from the first-driving-position to the second-driving-position or visa versa requires the U-pawl to be manually and forcefully pivoted, and wherein pivoting the U-pawl initially contracts the first spring while moving the U-pawl towards the middle-neutral-position and then expands the first spring when the U-pawl moves past the middle-neutral-position to the opposing driving position; and f) i) one or two holes provided through one or both sides of the handle assembly; or
  ii) an aligned first-set of two holes provided therethrough the two sides of the handle assembly; or
  iii) an aligned first-set of two holes and an aligned second-set of two holes provided therethrough the two sides of the handle assembly;
for an insertion of a blocking device i) in the at least one hole, or ii) in the aligned first-set of two holes, or iii) in the aligned second-set of two holes, and the insertion of the blocking device prevents the U-pawl from pivoting into the second-driving-position while allowing the U-pawl movement and normal back and forth operation of the U-pawl in the first-driving-position while ratchet turning the tube in the first-rotational-direction.

41. The ratchet load binder of claim 40 wherein the insertion of the blocking device in either i) the one or two holes, and at least one of the hole is a first hole, or ii) the first-set of two holes, and the insertion of the blocking device prevents the U-pawl from pivoting from the first-driving-position into or beyond the middle-neutral-position, and wherein the inserted blocking device allows normal back and forth operation of the U-pawl in the first-driving-position while ratchet turning the tube in the first-rotational-direction.

* * * * *